United States Patent
Ahn

(10) Patent No.: US 8,631,433 B2
(45) Date of Patent: Jan. 14, 2014

(54) IMAGE DISPLAY APPARATUS AND METHOD FOR OPERATING THE SAME

(75) Inventor: Kyutae Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 12/961,734

(22) Filed: Dec. 7, 2010

(65) Prior Publication Data

US 2011/0134325 A1 Jun. 9, 2011

(30) Foreign Application Priority Data

Dec. 8, 2009 (KR) .................. 10-2009-0121222

(51) Int. Cl.
*H04N 5/445* (2011.01)
*H04N 7/16* (2011.01)
*H04N 7/167* (2011.01)
*G06F 3/00* (2006.01)
*G06F 13/00* (2006.01)

(52) U.S. Cl.
USPC ............... 725/38; 725/27; 725/31; 725/39; 348/564

(58) Field of Classification Search
USPC .......................................... 725/41
See application file for complete search history.

(56) References Cited

U.S. PATENT DOCUMENTS

| 7,373,650 B1 * | 5/2008 | Rodriguez et al. ............ 725/41 |
| 7,650,626 B2 * | 1/2010 | Suh ............... 725/139 |
| 7,757,252 B1 * | 7/2010 | Agasse .............. 725/41 |
| 2002/0055855 A1 * | 5/2002 | Cule et al. .............. 705/2 |
| 2005/0091686 A1 * | 4/2005 | Sezan et al. ........... 725/46 |
| 2006/0064716 A1 * | 3/2006 | Sull et al. ............ 725/37 |
| 2007/0033145 A1 * | 2/2007 | Nishio et al. ........... 705/57 |
| 2010/0067583 A1 * | 3/2010 | Suh .............. 375/240.26 |
| 2010/0070927 A1 * | 3/2010 | Akiya et al. ............ 715/838 |
| 2010/0211584 A1 * | 8/2010 | Wang et al. ............ 707/758 |
| 2011/0083148 A1 * | 4/2011 | Sakaguchi et al. ......... 725/39 |

FOREIGN PATENT DOCUMENTS

| KR | 10-2007-0065529 A | 6/2007 |
| KR | 10-2007-0092419 A | 9/2007 |
| WO | WO 2006/074267 A2 | 7/2006 |

OTHER PUBLICATIONS

PCT International Search Report dated Sep. 9, 2011 issued in Application No. PCT/KR2010/008679.

* cited by examiner

*Primary Examiner* — Mark D Featherstone
*Assistant Examiner* — Akshay Doshi
(74) *Attorney, Agent, or Firm* — KED & Associates LLP

(57) ABSTRACT

An image display apparatus and a method for operating the image display apparatus are provided. The method receives a broadcast signal, generates a thumbnail image based on broadcast information included in the received broadcast signal when the received broadcast signal is a broadcast signal of at least one of an audio channel, a data channel, or a scrambled channel, and displays a thumbnail list including the generated thumbnail image. This allows the user to easily identify the contents of broadcasts of a plurality of channels.

18 Claims, 16 Drawing Sheets

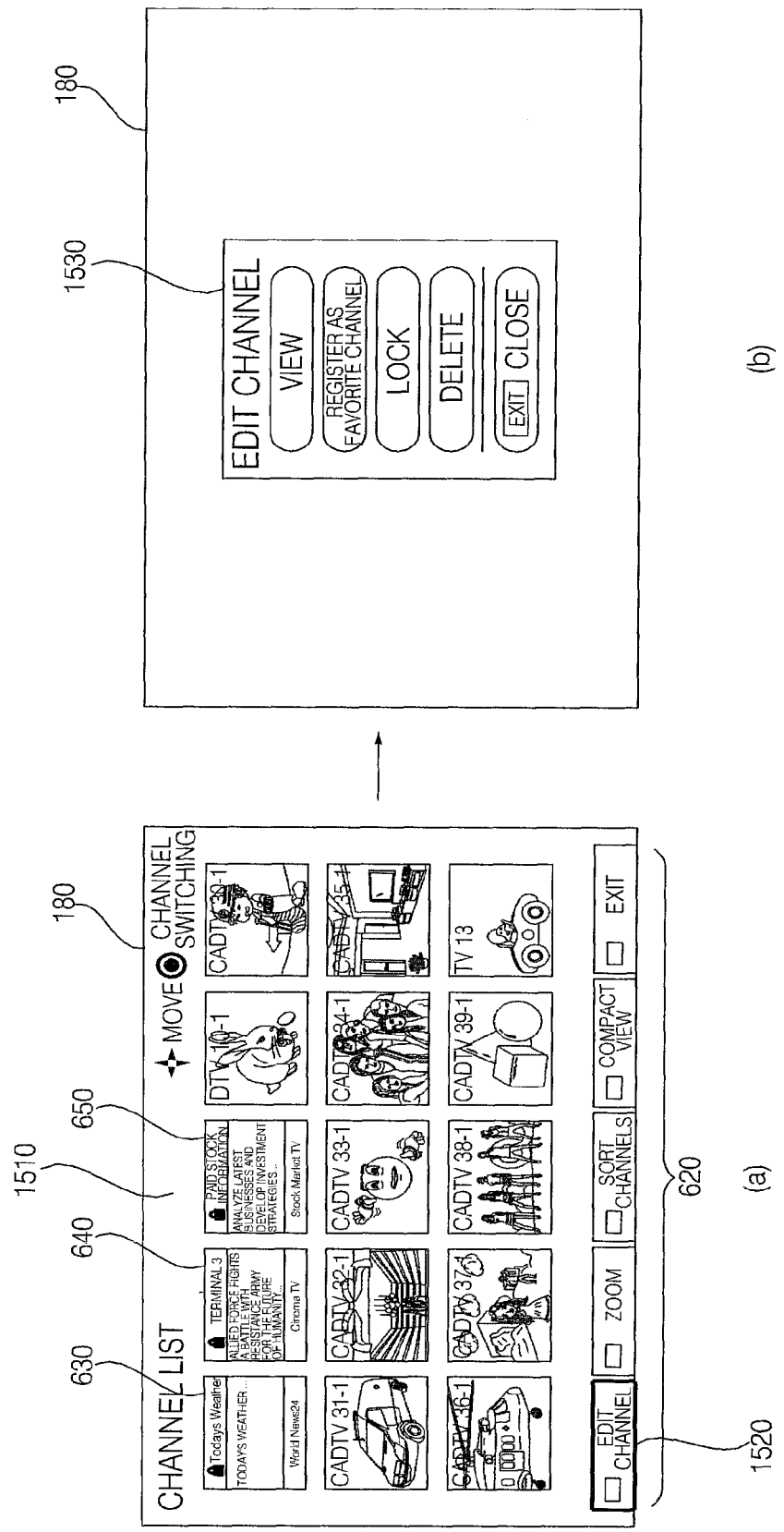

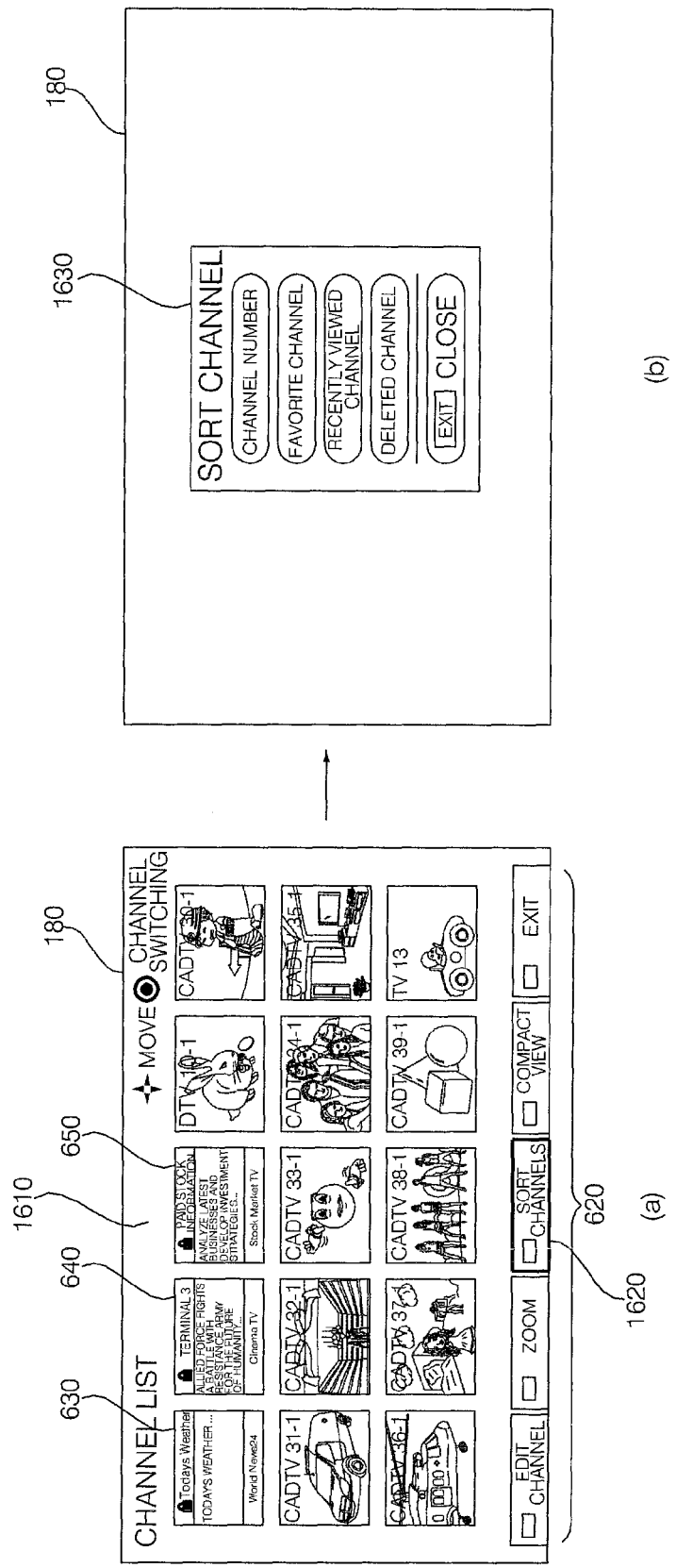

IMAGE DISPLAY APPARATUS AND METHOD FOR OPERATING THE SAME

CROSS-REFERENCE TO RELATED APPLICATION

This application claims the priority claims priority under 35 U.S.C. §119 of Korean Patent Application No. 10-2009-0121222, filed on 8 Dec. 2009 in the Korean Intellectual Property Office, the disclosure of which is incorporated herein by reference.

BACKGROUND

1. Field

The present disclosure relates to an image display apparatus and a method for operating the same, and more particularly to an image display apparatus and a method for operating the same, wherein a user can easily identify the contents of broadcasts of a plurality of channels.

2. Background

An image display apparatus is a device having a function to display an image that can be viewed by a user. The image display apparatus can display a broadcast program that the user has selected from among broadcast programs transmitted by a broadcast station. Currently, broadcasting is transitioning from analog broadcasting to digital broadcasting throughout the world.

Digital broadcasting transmits digital video and audio signals. Compared to analog broadcasting, digital broadcasting is more robust to external noise, resulting in less data loss, and is also advantageous in terms of error correction and provides clear high-resolution images or screens. Digital broadcasting also enables bi-directional services.

Various approaches have been explored to increase user comfort in such digital broadcasting environments.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 6 to 16 illustrate embodiments of the present disclosure.

DETAILED DESCRIPTION

Embodiments of the present disclosure will be described below with reference to the attached drawings.

The word "module" or "unit", which is added to the end of terms describing components, is merely used for ease of explanation of the present disclosure and has no specific meaning or function with respect to the components. Thus, the words "module" and "unit" may be used interchangeably.

Figure 1:
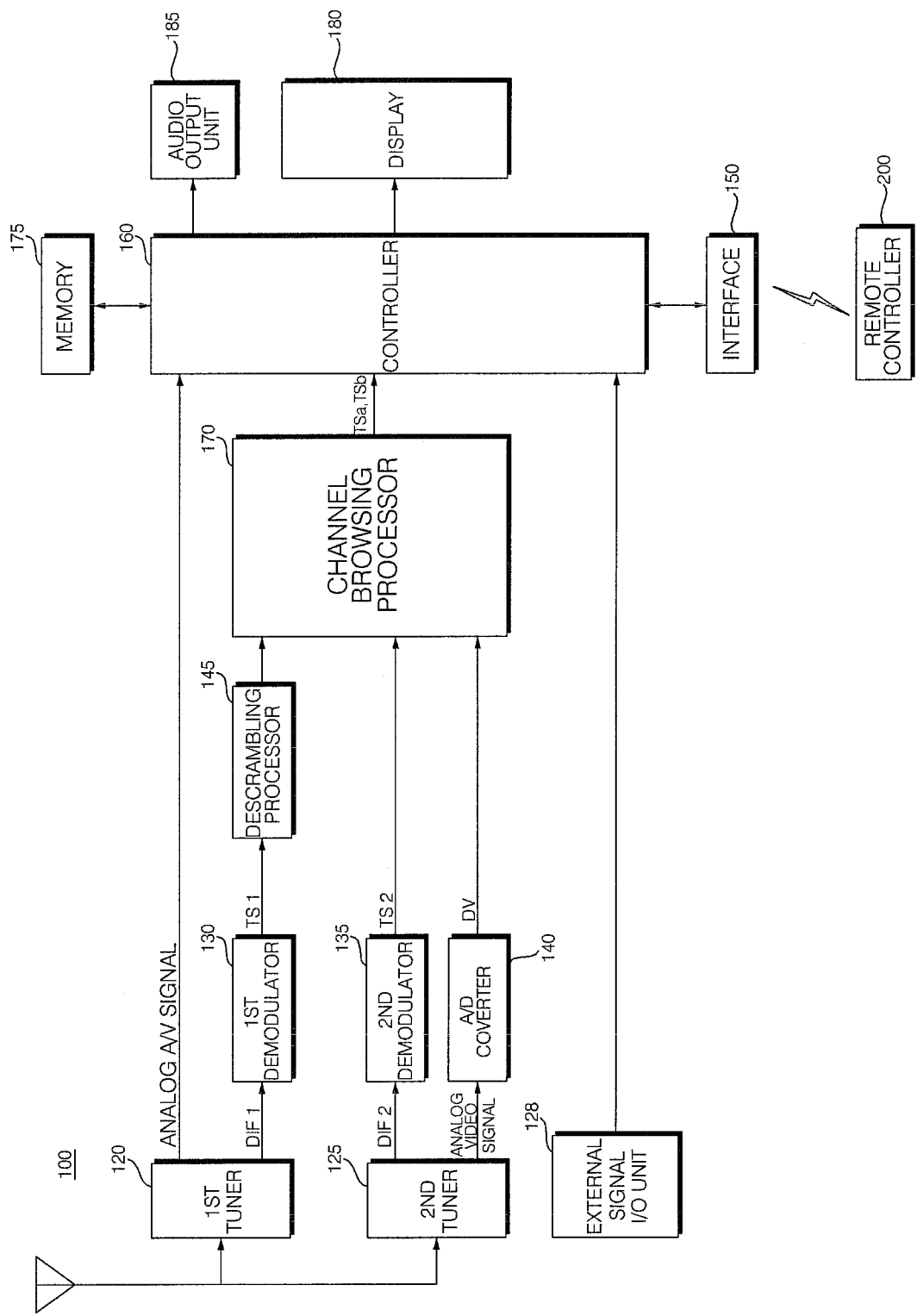
FIG. 1 is a block diagram of an image display apparatus according to an embodiment of the present disclosure.

FIG. 1 is a block diagram of an image display apparatus according to an embodiment of the present disclosure.

Referring to FIG. 1, an image display apparatus 100 according to an embodiment of the present disclosure includes a first tuner 120, a second tuner 125, an external signal input/output unit 128, a first demodulator 130, a second demodulator 135, an Analog-to-Digital (A/D) converter 140, a descrambling processor 145, an interface unit 150, a controller 160, a channel browsing processor 170, a memory 175, a display 180, and an audio output unit 185.

The first tuner 120 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband Audio/Video (A/V) signal. More specifically, if the selected RF broadcast signal is a digital broadcast signal, the first tuner 120 downconverts the selected RF broadcast signal into a digital IF signal (DIF 1). On the other hand, if the selected RF broadcast signal is an analog broadcast signal, the first tuner 120 downconverts the selected RF broadcast signal into an analog baseband A/V signal (CVBS 1/SIF). That is, the first tuner 120 may be a hybrid tuner capable of processing not only digital broadcast signals but also analog broadcast signals. The analog baseband A/V signal CVBS1/SIF may be directly input to the controller 160.

The first tuner 120 may also be capable of receiving single-carrier RF broadcast signals that are based on an Advanced Television Systems Committee (ATSC) scheme or multi-carrier RF broadcast signals that are based on a Digital Video Broadcasting (DVB) scheme as described later. The first tuner 120 may also be capable of receiving RF broadcast signals that are mixtures of single-carrier and multi-carrier signals based on a Digital Terrestrial Multimedia Broadcast (DTMB) scheme.

Similar to the first tuner 120, the second tuner 125 selects an RF broadcast signal corresponding to the channel selected by the user from among the plurality of RF broadcast signals received through the antenna, and downconverts the selected RF broadcast signal into a second digital IF signal (DIF 2) or an analog baseband A/V signal.

In addition, the second tuner 125 may sequentially or periodically select a number of RF broadcast signals corresponding to all broadcast channels previously stored by a channel storage function from a plurality of RF broadcast signals received through the antenna, and may downconvert the selected RF broadcast signals into IF signals or baseband A/V signals.

In an embodiment of the present disclosure, a thumbnail list including thumbnail images corresponding to broadcast images (or frames) of previously stored channels may be displayed on at least a part of the display 180 and therefore, separately from the first tuner 120, the second tuner 125 may be capable of sequentially or periodically receiving the RF broadcast signals corresponding to all of the previously stored channels.

For example, the first tuner 120 may downconvert a main RF broadcast signal selected by the user into an IF signal or a baseband A/V signal, and the second tuner 125 may sequentially or periodically select all RF broadcast signals or all other RF broadcast signals (i.e., sub-RF broadcast signals) except for the main RF broadcast signal and downconvert the selected RF broadcast signals into IF signals or baseband A/V signals.

The external signal input/output unit 128 receives external signals from an external device. To accomplish this, the external signal input/output unit 128 may include an A/V Input/Output (I/O) unit (not shown) and a wireless communication module (not shown).

The external signal input/output unit 128 is connected to an external device such as a Digital Versatile Disc (DVD) player, a Bluray player, a game console, a camcorder, or a computer (e.g., a laptop computer). Then, the external signal input/output unit 128 receives video, audio, and/or data signals from the external device and transmits the received external input signals to the controller 160. In addition, the external signal input/output unit 128 may output video, audio, and data signals processed by the controller 160 to the external device.

In order to receive or output A/V signals from or to the external device, the A/V I/O unit of the external signal input/output unit 128 may include an Ethernet port, a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, a D-sub port, an Institute of Electrical and Electronics Engineers (IEEE)-1394 port, a Sony/Philips Digital Interconnect Format (S/PDIF) port, and a LiquidHD port.

Analog signals received through the CVBS port, the S-video port, and the like may be converted into digital signals through the A/D converter 140. Digital signals received through the other ports may be input to the channel browsing processor 170 without A/D conversion.

The wireless communication module of the external signal input/output unit 128 may wirelessly access the Internet. For wireless Internet access, the wireless communication module may use a Wireless Local Area Network (WLAN) (i.e., Wi-Fi), Wireless Broadband (Wibro), World Interoperability for Microwave Access (WiMax), and High Speed Downlink Packet Access (HSDPA).

In addition, the wireless communication module may perform short-range wireless communication with other electronic devices.

For the short-range wireless communication, the wireless communication module may use, for example, Bluetooth, Radio-Frequency IDentification (RFID), Infrared Data Association (IrDA), Ultra WideBand (UWB), and ZigBee.

The external signal input/output unit 128 may be connected to various set-top boxes through at least one of the various ports described above and may thus receive data from or output data to the various set-top boxes.

For example, when connected to an Internet Protocol Television (IPTV) set-top box, the external signal input/output unit 128 may transmit video, audio and data signals processed by the IPTV set-top box to the controller 160 and may transmit various signals processed by the controller 160 to the IPTV set-top box.

The term "IPTV" is used to indicate a variety of TVs which are based on various transmission networks, such as an ADSL TV, a VDSL TV, and an FTTH TV, and a TV over DSL, a Video over DSL, a TV over IP (TVIP), a Broadband TV (BTV), an Internet TV, and a full-browsing TV.

The image display apparatus 100 may access the Internet or perform communication through a network interface such as the Ethernet port of the external signal input unit 128, a wireless communication module, or a set-top box for an Internet Protocol (IP) TV.

The external signal input unit 128 may also be connected to a communication network that enables video or audio communication. The communication network may include a mobile communication network, a public telephone network, or a broadcast communication network connected through a LAN.

Although not illustrated, when the signal output from the external signal input unit 128 is digital, the signal may be input to and processed by the channel browsing processor 170.

The first demodulator 130 receives the converted digital IF signal from the first tuner 120 and demodulates the received signal.

For example, when the digital IF signal (DIF 1) output from the first tuner 120 is an ATSC or DVB signal, the first demodulator 130 performs 8-Vestigal Side Band (8-VSB) demodulation or Coded Orthogonal Frequency Division Modulation (COFDMA) demodulation on the digital IF signal. To accomplish this, the first demodulator 130 may include a Trellis decoder, a de-interleaver, a Reed Solomon decoder, and the like to perform Trellis decoding, de-interleaving, Reed Solomon decoding, and the like.

The first demodulator 130 may perform demodulation and channel decoding upon the first digital IF signal DIF 1 received from the first tuner 120, thereby obtaining a first stream signal TS1. The first stream signal TS1 may be a signal in which a video signal, an audio signal and a data signal are multiplexed. For example, the first stream signal TS1 may be an MPEG-2 TS signal obtained by multiplexing an MPEG-2 video signal and a Dolby AC-3 audio signal.

The first stream signal TS1 is input to the controller 160 and is then subjected to demultiplexing and signal processing by the controller 160. In this embodiment, the first stream signal TS1 is input to the channel browsing processor 170 and is thus subjected to a channel browsing operation prior to input to the controller 160. The channel browsing operation will be described later in detail.

The second demodulator 135 receives the second digital IF signal DIF 2 from the second tuner 125 and demodulates the second digital IF signal DIF 2, thereby generating a second stream signal TS2. The operation of the second demodulator 135 is almost the same as the operation of the first demodulator 130.

The A/D converter 140 converts an analog baseband video signal CVBS 2 output from the second tuner 125 into a digital signal. For example, the A/D converter 140 performs sampling and quantization of the analog signal to convert the same into a digital video signal DV. The digital video signal DV may be a signal that has yet to be encoded. The digital video signal DV is provided to and processed by the channel browsing processor 170.

The descrambling processor 145 descrambles a scrambled video signal. Specifically, the descrambling processor 145 receives and descrambles a stream (TS1) output from the first demodulator 130.

For example, when a received cable or terrestrial channel has been encrypted, for example, because the channel is a paid-access channel, the descrambling processor 145 descrambles the channel so that it is viewable. Whether or not a channel has been scrambled may be determined through a header (for example, a PID) of a stream. An operation for determining whether or not a channel has been scrambled and an operation for issuing an instruction to perform descrambling may be performed by the descrambling processor 145 or by the controller 160.

The descrambling processor 145 may be implemented as a Conditional Access Module (CAM) in the form of a detachable smart card in which a key for decryption is embedded. For example, the descrambling processor 145 may descramble a Packet Identifier (PID) in a received stream when the PID has been encrypted. This allows an authenticated user to easily view a scrambled channel.

The interface unit 150 transmits a signal received from the user to the controller 160 or transmits a signal received from the controller 160 to the user. For example, the interface unit 150 may receive various user input signals such as a power-on/off signal, a channel selection signal, and a screen setting signal from a remote controller 200 or may transmit a signal received from the controller 160 to the remote controller 200 according to a variety of communication schemes such as a Radio Frequency (RF) communication scheme or an Infrared (IR) communication scheme.

The controller 160 may demultiplex an input stream signal into a number of signals and process the demultiplexed signals so that the processed signals can be output as A/V data. The controller 160 may control the image display apparatus 100 according to a user command received through the interface unit 150 or the like or using an internal program. The controller 160 may control all other operations of the image display apparatus 100.

Although not illustrated, the controller 160 may include a demultiplexer, a video processor, an audio processor, and an OSD generator.

The controller 160 may control the tuners 120 and 125 to tune to an RF broadcast signal corresponding to a selected channel or a previously stored channel.

The controller 160 may demultiplex an input stream signal, e.g. an MPEG-2 TS signal, into a video signal, an audio signal, and a data signal.

Thereafter, the controller 160 may perform video processing upon the video signal.

For example, if the video signal is an encoded signal, the controller 160 may decode the video signal. More specifically, if the video signal is an MPEG-2 encoded signal, the controller 160 may decode the video signal through an MPEG-2 decoder. If the video signal is an H.264-encoded DMB or DVB-handheld (DVB-H) signal, the controller 160 may decode the video signal through an H.264 decoder. If the video signal is an AVS-encoded DTMB video signal, the controller 160 may decode the video signal through an AVS decoder.

In addition, the controller 160 may adjust the brightness, tint, and color of the video signal.

The video signal processed by the controller 160 is displayed on the display 180. Alternatively or additionally, the video signal processed by the controller 160 may be output to an external output port connected to an external output device.

The controller 160 may also perform audio processing upon the audio signal obtained by demultiplexing the input stream signal.

For example, if the audio signal is an encoded signal, the controller 160 may decode the audio signal. More specifically, if the audio signal is an MPEG-2 encoded signal, the controller 160 may decode the audio signal by MPEG-2 decoding. On the other hand, if the audio signal is an MPEG-4 Bit Sliced Arithmetic Coding (BSAC)-encoded terrestrial DMB signal, the controller 160 may decode the audio signal by MPEG-4 decoding. If the audio signal is an MPEG-2 Advanced Audio Coding (AAC)-encoded DMB or DVB-H signal, the controller 180 may decode the audio signal through an AAC decoder.

In addition, the controller 160 may adjust the bass, treble or volume of the audio signal.

The audio signal processed by the controller 160 is output to the audio output unit 185, e.g., a speaker. Alternatively or additionally, the audio signal processed by the controller 160 may be output to an external output port connected to an external output device (not shown).

The controller 160 may process the data signal obtained by demultiplexing the input stream signal. For example, if the data signal is an encoded signal, the controller 160 may decode the data signal. The encoded data signal may be an Electronic Program Guide (EPG) including broadcast information such as a program title, a program description, a start time, an end time, and channel information of each program played on each channel. The EPG may include ATSC-Program and System Information Protocol (ATSC-PSIP) information in the case of the ATSC scheme and may include DVB-Service Information (DVB-SI) in the case of the DVB scheme. ATSC-PSIP information or DVB-SI may be included in the header of a TS, i.e., the 4-byte header of an MPEG-2 TS.

The controller 160 may perform On-Screen Display (OSD) processing. More specifically, the controller 160 may generate an OSD signal for displaying various information on the display 180 as graphic or text data based on a user input signal received from the remote controller 200 and at least one of a processed video signal or a processed data signal. The OSD signal may be input to the display 180 along with the processed video and data signals.

The OSD signal may include various data such as a User-Interface (UI) screen, various menu screens, widgets, and icons for the image display apparatus 100.

The controller 160 receives and processes an analog baseband video/audio signal (CVBS/SIF). Here, the controller 160 may receive the analog baseband video/audio signal from the tuner 120 or from the external signal input unit 128. The processed video signal is input to the display 180 so that the display 180 displays a corresponding image and the processed audio signal is input to the audio output unit 185, for example, a speaker, so that the audio output unit 185 outputs a corresponding sound.

The channel browsing processor 170 may perform a channel browsing process on a broadcast signal corresponding to a received channel. The channel browsing processor 170 may also perform a channel browsing process on various external signals input through the external signal input unit 128. The following description will be given focusing on a channel browsing process performed on a broadcast signal.

Specifically, the channel browsing processor 170 may receive the first or second stream signal TS1 or TS2 from the first or second demodulator 130 or 135, demultiplex the first or second stream signal TS1 or TS2, and extract some of the frames of a video signal obtained through demultiplexing to generate a thumbnail image. Thereafter, the channel browsing processor 170 may generate a new TS signal, i.e., a sub-stream signal TSa, by multiplexing the signals including the generated thumbnail image signal.

On the other hand, when the signal obtained through demultiplexing (hereinafter also referred to as a "demultiplexed signal") is a broadcast signal corresponding to a scrambled channel, the channel browsing processor 170 generates a thumbnail based on broadcast information in the broadcast signal. Since there is no video signal to be extracted and generated when the demultiplexed signal corresponds to a scrambled channel, the channel browsing processor 170 generates a thumbnail image based on additional broadcast information. Thus, even when the demultiplexed signal is a scrambled channel signal, the user can easily identify the contents of the channel by viewing a displayed thumbnail list.

In addition, when the signal obtained through demultiplexing is a broadcast signal corresponding to an audio or data channel, the channel browsing processor 170 generates a thumbnail image based on broadcast information in the broadcast signal. Since there is no video signal to be extracted and generated when the demultiplexed signal corresponds to an audio or data channel, the channel browsing processor 170 generates a thumbnail image based on additional broadcast information. Thus, even when the demultiplexed signal is an audio or data signal, the user can easily identify the contents of the channel by viewing a displayed thumbnail list.

The channel browsing processor 170 may allow one of the input stream signals TS1 or TS2 to bypass processing of the channel browsing processor 170 and output the bypassed signal as a main stream TSb. This process may be performed during a broadcast image viewing operation during which images corresponding to a main stream are displayed or during brief viewing of a broadcast channel list. Here, the stream signal TSa or TSb may be an MPEG-2 TS.

The channel browsing processor 170 may also generate a thumbnail image based on a digital signal DV produced through conversion by the channel browsing processor 170 and multiplex signals including the thumbnail image signal and output a new stream signal TSa.

The channel browsing processor 170 will be described later in further detail with reference to FIG. 2.

The memory 175 may store various programs for processing and controlling signals of the controller 160, and may also store processed video, audio, and data signals.

The memory 175 may temporarily store a video, audio or data signal received from the external signal input/output unit 128.

The memory 175 may store broadcast channels identified through the channel storage function.

The memory 175 may include, for example, at least one of a flash memory-type storage medium, a hard disk-type storage medium, a multimedia card micro-type storage medium, a card-type memory (for example, an SD or XD memory), a Random Access Memory (RAM), or a Read-Only Memory (ROM) such as an Electrically Erasable Programmable ROM (EEPROM).

Although the memory 175 is illustrated as being configured separately from the controller 160, the present disclosure is not limited to the illustrated configuration and the memory 175 may be incorporated into the controller 160, for example.

The image display apparatus 100 may play a file (such as a moving image file, a still image file, a music file, or a text file) stored in the memory 175 to the user.

The display 180 may convert a processed video signal, a processed data signal, and an OSD signal received from the controller 160 or a video signal and a data signal received from the external signal input/output unit 128 into RGB signals, thereby generating drive signals. The display 180 may be various types of displays such as a Plasma Display Panel (PDP), a Liquid Crystal Display (LCD), an Organic Light-Emitting Diode (OLED) display, a flexible display, and a three-dimensional (3D) display. The display 180 may also be a touch screen that can be used not only as an output device but also as an input device.

The audio output unit 185 may receive a processed audio signal (e.g., a stereo signal, a 3.1-channel signal or a 5.1-channel signal) from the controller 160 and output the received audio signal as voice. The audio output unit 185 may be various types of speakers.

The remote controller 200 transmits user input to the interface unit 150. For the transmission of user input, the remote controller 200 may use various communication techniques such as Bluetooth, RF, IR, UWB and ZigBee.

In addition, the remote controller 200 may receive a video signal, an audio signal, and a data signal from the interface unit 150 and output the received signals.

The remote controller 200 may be a pointing device that may be controlled according to x, y, and z-axis operations.

While two tuners are provided and at least one thumbnail image is displayed on the display 180 in the illustrated example, the present disclosure is not limited to this example and an embodiment of the present disclosure may also be implemented using a single tuner.

The image display apparatus 100 may be a fixed digital broadcast receiver capable of receiving at least one of ATSC (8-VSB) broadcast programs, DVB-T (COFDM) broadcast programs, DTMB broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (Media-FLO) broadcast programs. Alternatively or additionally, the image display apparatus 100 may be a digital broadcast receiver capable of receiving cable broadcast programs, satellite broadcast programs or IPTV programs.

Examples of the image display apparatus 100 may include a TV receiver, a mobile phone, a smart phone, a laptop computer, a digital broadcasting receiver, a Personal Digital Assistant (PDA) and a Portable Multimedia Player (PMP).

The configuration of the image display apparatus 100 illustrated in FIG. 1 is purely illustrative and serves only to explain the embodiment of the present disclosure. The image display apparatus 100 may also be configured such that some components of the image display apparatus 100 are integrated or omitted or the image display apparatus 100 includes additional components depending on the specifications of the image display apparatus 100. For example, two or more components of the image display apparatus 100 may be combined into a single component or a single component thereof may be separated into two more components as needed. The functions of the components of the image display apparatus 100 are set forth herein only to explain the embodiments of the present disclosure and the specific operations and configurations of the components should not be construed as limiting the scope of the present disclosure.

Figure 2:
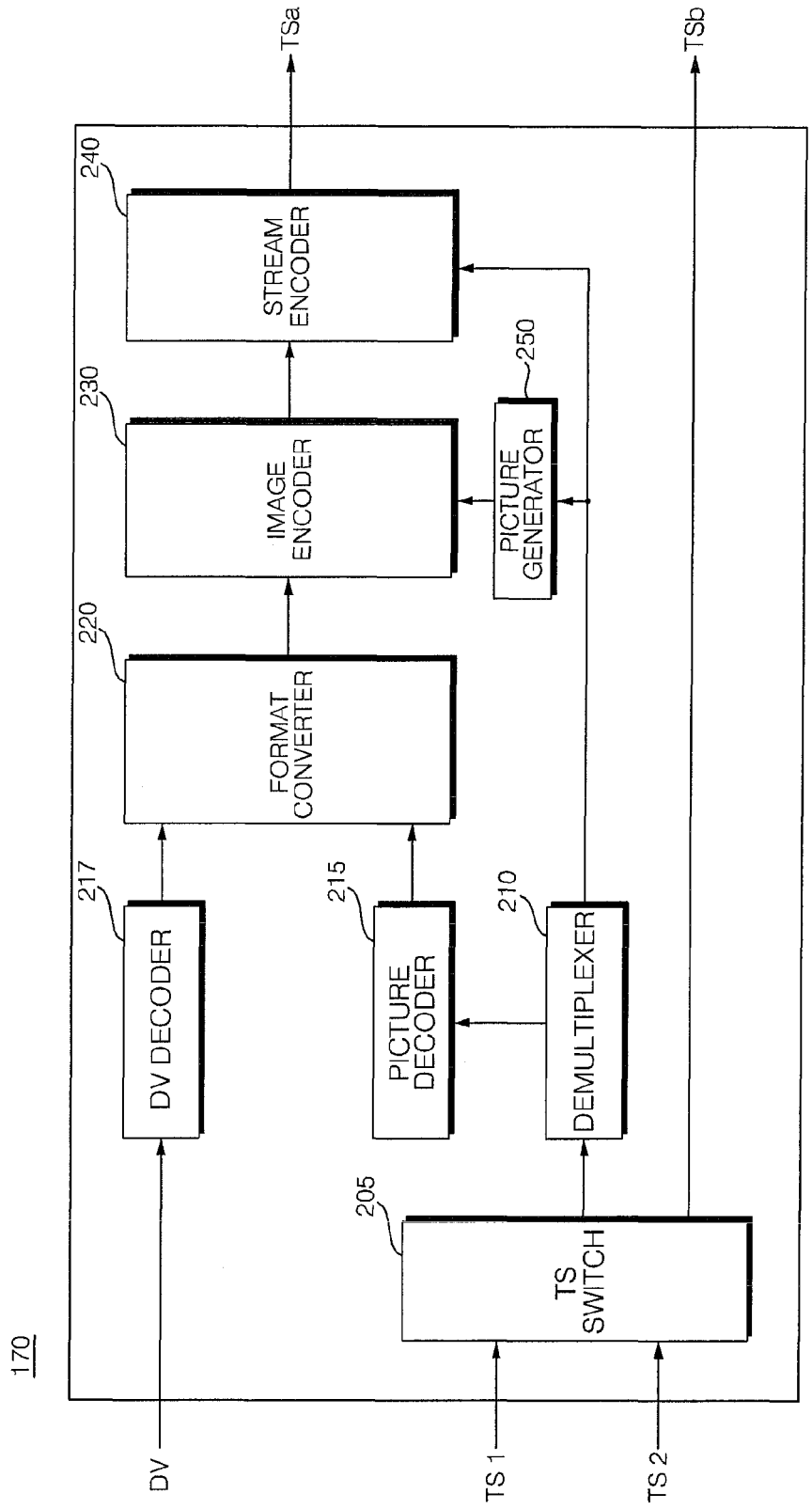
FIG. 2 is a block diagram of a channel browsing processor shown in FIG. 1.
Figure 3:
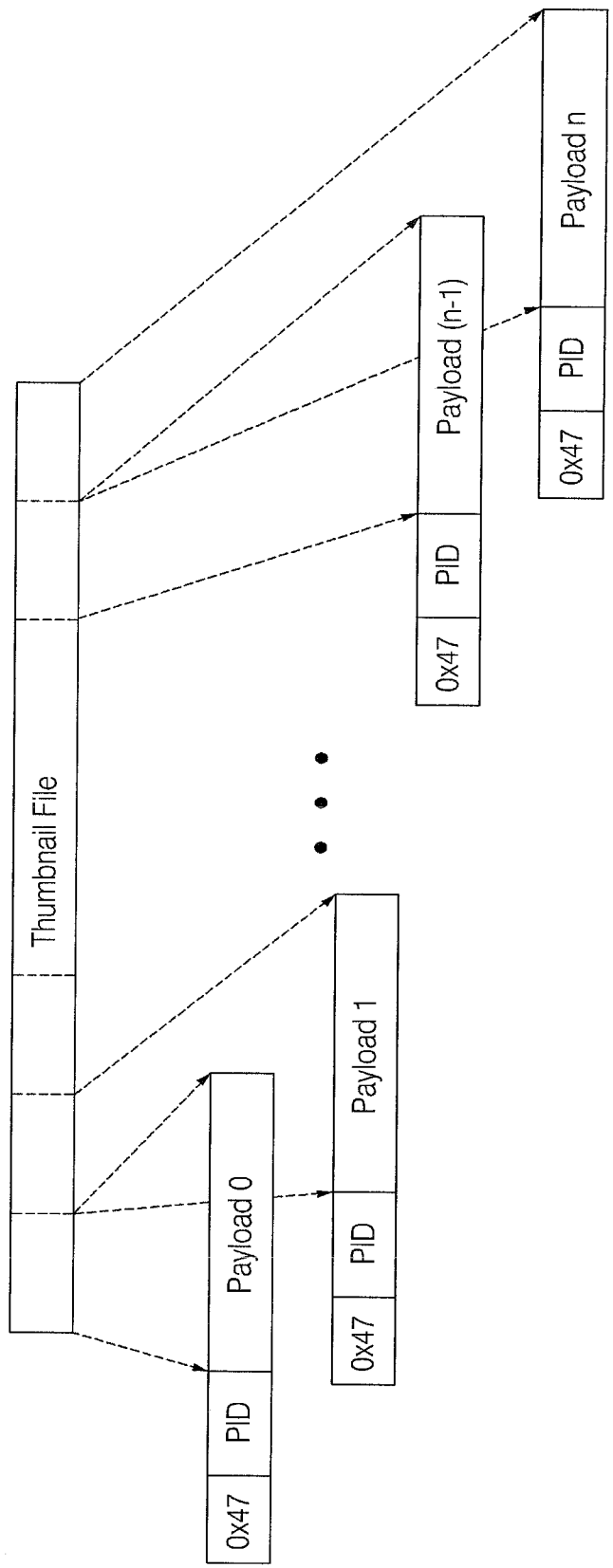
FIG. 3 illustrates an example of a stream output from the channel browsing processor shown in FIG. 2.

FIG. 2 is a block diagram of the channel browsing processor 170 illustrated in FIG. 1 and FIG. 3 illustrates an example of a stream output from the channel browsing processor of FIG. 2.

Referring to FIG. 2, the channel browsing processor 170 may include a TS switch 205, a demultiplexer 210, a picture decoder 215, a DV decoder 217, a format converter 220, an image encoder 230, a stream encoder 240, and a picture generator 250.

The TS switch 205 may select one of the first and second streams TS1 and TS2 and allow the selected stream to bypass conversion by the channel browsing processor 170 so that the channel browsing processor 170 outputs the selected stream as a main stream TSb. The other stream is transferred to the demultiplexer 210.

The main stream TSb is subjected to signal processing by the controller 160 and a corresponding image is then displayed on the display 180. That is, a main image corresponding to the main stream TSb is displayed on the display 180 before brief viewing of a broadcast channel list, i.e., during viewing of a broadcast channel. Alternatively, a main image corresponding to the main stream TSb is displayed over most of the display 180 during brief viewing of the broadcast channel list.

The sub-stream TSa may be transferred to the demultiplexer 210 and may then be used to generate a thumbnail image. The generated thumbnail image may be transferred in the form of a stream to the controller 160. In response to input of an instruction to view a broadcast channel list, a thumbnail list including the generated thumbnail image is displayed on the display 180. The thumbnail list may be displayed so as to cover a portion of the display 180 during brief list viewing and may displayed so as to cover the entirety of the display 180 during full list viewing.

The demultiplexer 210 may demultiplex the first or second stream signal TS1 or TS2 into a video signal, an audio signal and a data signal.

The demultiplexer 210 may analyze a header (i.e., a PID) in the stream to determine whether or not the broadcast signal of the received channel has been scrambled. When the received channel has been scrambled, the demultiplexer 210 may provide the data signal including broadcast information to the picture generator 250. When the received channel has not been scrambled, the demultiplexer 210 may provide the video signal to the picture decoder 215, and output the audio signal and the data signal to the stream encoder 240 to allow the stream encoder 240 to generate a new stream.

The demultiplexer 210 may determine whether or not the broadcast signal of the received channel is a broadcast signal of an audio channel or a data channel. When the received channel is an audio channel or a data channel, the demultiplexer 210 provides a data signal including broadcast information to the picture generator 250.

The picture decoder 215 decodes at least a part of the received video signal through a decoder such as an MPEG-2, MPEG-4, or H.264 AVS decoder. The decoded image may be a still image or a moving image. For example, the picture decoder 215 may decode an Intra-coded (I) picture or a section of the received video signal.

The DV decoder 217 receives the digital signal DV from the A/D converter 140 and acquires a digital image from the digital signal DV.

The format converter 220 converts the format of a video signal received from the picture decoder 215 or the DV decoder 217. For example, the format converter 220 may change the size (or resolution) of the input image signal. The size change depends on the number of thumbnail images displayed on the display 180. For example, the size of each thumbnail image may decrease as the number of thumbnail images displayed on the display 180 increases.

The image encoder 230 may encode the image signal received from the format converter 220.

For example, the image encoder 230 may encode the image signal received from the format converter 220 by JPEG coding, MPEG-2 coding, or the Thumbnail images of still images or thumbnail images of moving images encoded by the image encoder 230 may be displayed on a portion of the display 180.

The stream encoder 240 re-encodes an encoded video signal received from the image encoder 230 into a stream format. For example, the stream encoder 240 may multiplex the encoded video signal from the image encoder 230 and the audio and data signals obtained by the demultiplexing performed in the demultiplexer 210 into a stream, for example, an MPEG-2 TS.\

When the received channel is a scrambled channel, an audio channel, or a data channel, the picture generator 250 receives broadcast information in the demultiplexed stream and generates a thumbnail image based on the broadcast information. For example, the picture generator 250 generates a thumbnail image based on the broadcast information, similar to generation of an OSD by the controller 160. The thumbnail image may be a still image or a moving image. The size of the thumbnail image may vary depending on the number of thumbnail images displayed on the display 180. For example, the size of each thumbnail image may decrease as the number of thumbnail images displayed on the display 180 increases.

The thumbnail image generated by the picture generator 250 may be provided to the image encoder 230 and the image encoder 230 may then encode the thumbnail image into a predetermined format as described above.

As a result, the channel browsing processor 170 may output a sub-stream TSa including the generated thumbnail image or a main stream TSb that bypasses processing of the channel browsing processor 170. The sub-stream TSa may include a stream of the thumbnail image and a newly multiplexed stream.

FIG. 3 illustrates a stream including a thumbnail image. For example, when the stream is an MPEG-2 TS, the stream may have a length of 188 bytes, including a 4-byte header and a 184-byte payload. The 4-byte header includes 1 sync byte or 8 sync bits (having a value of "0x47") and a 3-byte PID. The type of the TS packet is determined by this PID. The type of the broadcast channel such as a scrambled channel, an audio channel, a data channel, or a video channel is determined based on the PID.

Although the sub-stream TSa and the main stream TSb are input to the controller 160 through separate paths in the example illustrated in FIG. 2, the present disclosure is not limited to this example and the sub-stream TSa and the main stream TSb may be input to the controller 160 through the same path. In this case, the controller 160 may include a single stream input port. Here, the sub-stream TSa and the main stream TSb have different PIDs and are discriminated through the PIDs.

In addition, although a sub-stream TSa including a thumbnail image is output in the example illustrated in FIG. 2, the present disclosure is not limited to this example and the thumbnail image encoded by the image encoder 230 may be output without stream encoding. In this case, the output thumbnail image may be input to the controller 160 through a data port of the controller 160 rather than through a stream input port thereof.

The configuration of the channel browsing processor 170 shown in FIG. 2 is purely illustrative and serves only to explain the embodiment of the present disclosure. The channel browsing processor 170 may also be configured such that some components of the channel browsing processor 170 are integrated or omitted or the channel browsing processor 170 includes additional components depending on the specifications of the channel browsing processor 170.

Figure 4:
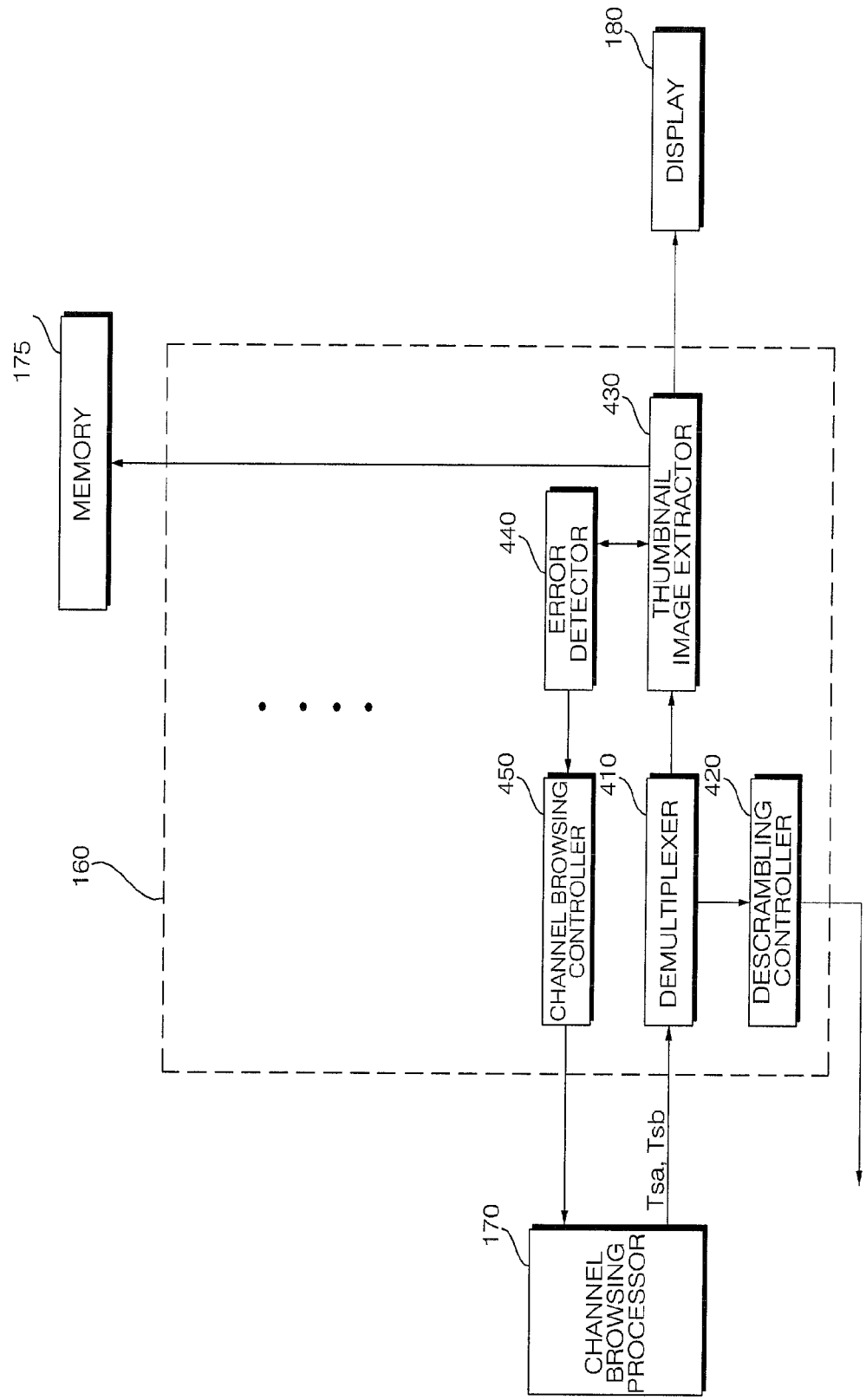
FIG. 4 is a simple block diagram of a controller shown in FIG. 1.

FIG. 4 is a brief block diagram of the controller shown in FIG. 1.

The controller 160 may include a demultiplexer 410, a descrambling controller 420, a thumbnail image extractor 430, an error detector 440, and a channel browsing controller 450 according to an embodiment of the present disclosure. The controller 160 may further include a video signal processor, an audio signal processor, an OSD generator, and the like.

The demultiplexer 410 may receive and demultiplex streams Tsa and Tsb from the channel browsing processor 170. The demultiplexed signals may be output to the thumbnail image extractor 430 or a video processor (not shown).

The demultiplexer 410 may analyze a header (for example, a PID) of the stream during demultiplexing of the stream and may notify upon determining that the stream is that of a scrambled channel.

The descrambling controller 420 may control the descrambling processor 145 to be activated. For example, the descrambling controller 420 may control the descrambling processor 145 to be activated when an authenticated user has selected viewing of a scrambled channel. The descrambling controller 420 may control the descrambling processor 145 to be activated when an authenticated user has input a command to focus upon a thumbnail image of a scrambled channel during display of a thumbnail list. The descrambling controller 420 may also control the descrambling processor 145 to perform a bypass operation for other channels. The descrambling processor 145 is selectively activated according to such descrambling control.

An error may occur during transmission of the stream of a thumbnail image processed by the channel browsing processor 170 to the controller 160 or may occur for various other reasons. In this case, there is a need to reliably process an updated thumbnail image.

The thumbnail image extractor 430 may extract a thumbnail image from the input demultiplexed signal. For example, the thumbnail image extractor 430 may decode the input demultiplexed signal to extract only the thumbnail image.

The thumbnail image extractor 430 may generate a thumbnail list including the extracted thumbnail image. Accordingly, the thumbnail image extractor 430 may control the display 180 to display the generated thumbnail list.

The thumbnail image extractor 430 may also generate a thumbnail list including an updated thumbnail image.

The thumbnail image extractor 430 may also perform database management. For example, the thumbnail image extractor 430 may generate respective databases of terrestrial broadcasts, cable broadcasts, digital broadcasts, analog broadcasts, and external input signals. A variety of functions to add, remove, change, and search for a thumbnail image may also be provided.

The error detector 440 checks for errors in the thumbnail image extracted by the thumbnail image extractor 430. When an error is detected in the thumbnail image, the error detector 440 serves to prevent display of a thumbnail image that malformed due to such error. To accomplish this, the error detector 440 may check at least one of size information, syntax information, checksum information, continuity information, or content information of the extracted thumbnail image.

When a thumbnail image has been extracted in units of packets by the thumbnail image extractor 430, the error detector 440 may check size information of the thumbnail image in units of packets and may check syntax information or checksum information in units of packets. When a thumbnail image has been extracted in units of consecutive packets, the error detector 440 may check continuity of the thumbnail received in units packets by checking information indicating the sequence of the packets, for example, by checking packet sequence bits.

The error detector 440 may also check whether or not the thumbnail image contains an error by checking contents of the thumbnail image, i.e., by temporarily decoding at least a part of the encoded thumbnail image.

When the error detector 440 has detected no error, the error detector 440 may transmit a control signal to the thumbnail image extractor 430 to control the display 180 to display a screen including the extracted thumbnail image.

When the error detector 440 has detected an error, the error detector 440 may transmit a control signal to the channel browsing controller 450 or the thumbnail image extractor 430 to instruct the channel browsing controller 450 to stop updating the thumbnail image or to instruct the thumbnail image extractor 430 to stop extracting the thumbnail image. The error detector 440 may also allow the erroneous thumbnail image to be removed from the thumbnail list.

The channel browsing controller 450 controls the channel browsing processor 170 to operate according to a user command. For example, when the user has input a channel list view command which will cause a thumbnail list to be displayed, the channel browsing controller 450 may control the channel browsing processor 170 to generate a thumbnail image. The channel browsing controller 450 may also control the channel browsing processor 170 to perform an update operation. The channel browsing controller 450 may set an update period of a thumbnail image to be different from the update period of another thumbnail image. In association with this operation, the channel browsing controller 450 may control operations of the first tuner 120, the second tuner 125, the first demodulator 130, and the second demodulator 135.

When the error detector 440 has detected an error, the channel browsing controller 450 may allow the channel browsing processor 170 to stop updating the thumbnail image.

The channel browsing controller 450 may control the associated modules to receive broadcast signals corresponding to all stored broadcast channels and to generate corresponding thumbnail images.

The channel browsing controller 450 may also control the associated modules to receive broadcast signals corresponding to a predetermined number of channels rather than all channels and to generate corresponding thumbnail images.

The predetermined number of channels may be channels corresponding to thumbnail images included in the thumbnail list which may be a thumbnail list that has been most recently displayed on the display 180.

The memory 175 may store thumbnail images extracted by the thumbnail image extractor 430. The thumbnail images stored in the memory 175 may be displayed on the display 180, for example, when the user has input a channel list view command.

The demultiplexer 410, the descrambling controller 420, the thumbnail image extractor 430, the error detector 440, and the channel browsing controller 450 need not be provided in the controller 160 and may be implemented individually or 2 or more thereof may be implemented in combination.

Figure 5:
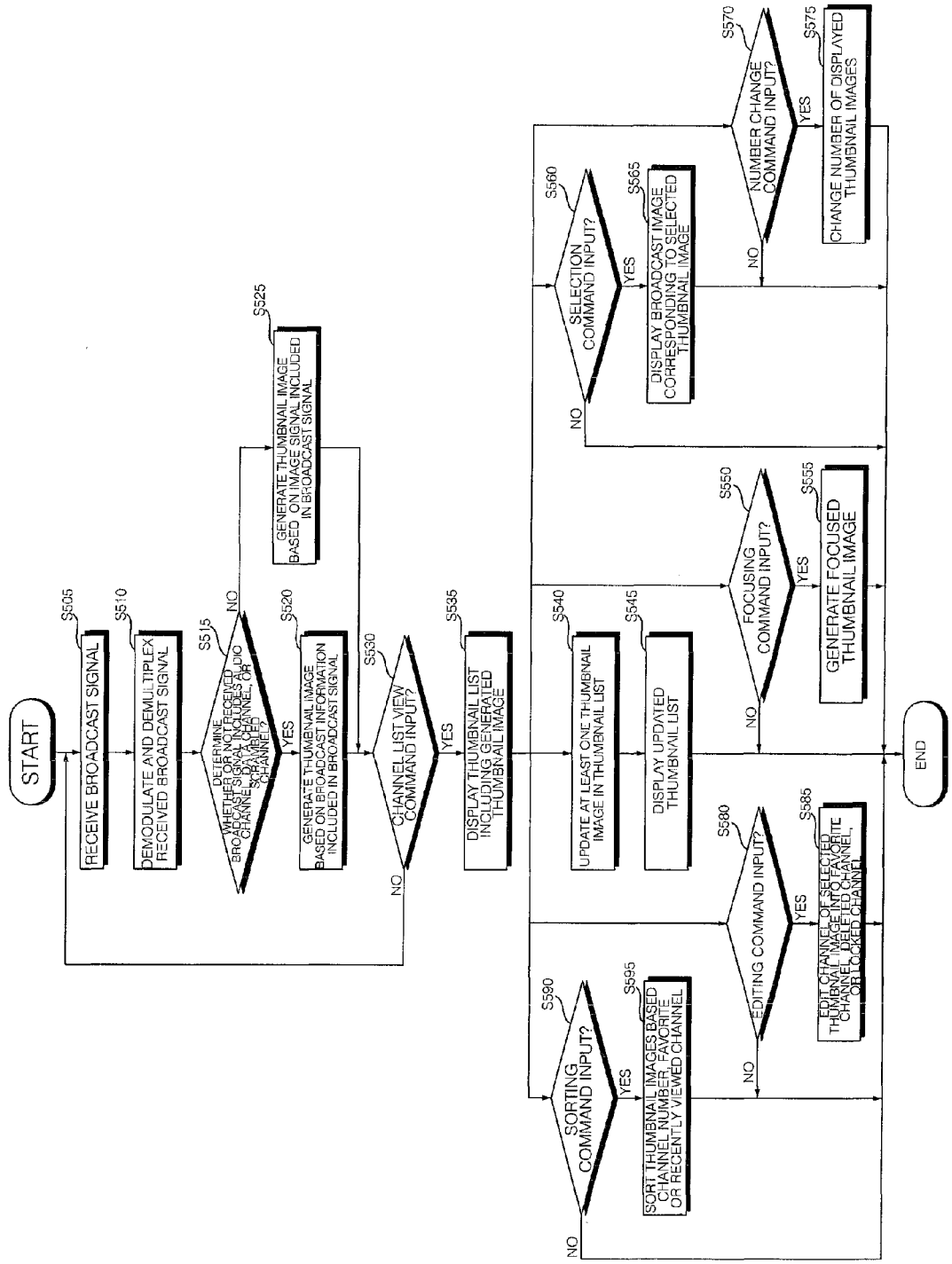
FIG. 5 is a flow chart illustrating a method for operating an image display apparatus according to an embodiment of the present disclosure.

FIG. 5 is a flow chart illustrating a method for operating an image display apparatus according to an embodiment of the present disclosure. FIGS. 6 to 16 show embodiments of the present disclosure.

As shown in FIG. 5, first, a broadcast signal is received (S500). Then, the received broadcast signal is demodulated and demultiplexed (S510).

The tuners 120 and 125 receive a broadcast signal of a selected channel or a broadcast signal of a stored channel. The first tuner 120 may receive a broadcast signal of a broadcast channel that the viewer wishes to view and the second tuner 125 may sequentially receive broadcast signals of stored channels. The broadcast signals of the channels sequentially received by the second tuner 125 may be used when the channel browsing processor 170 generates thumbnails (or thumbnail images).

The operations of the tuners 120 and 125 are controlled by the controller 160.

When the received broadcast signals are digital broadcast signals, the broadcast signals are demodulated by the demodulators 130 and 135 as described above. The received broadcast signals may also be subjected to channel decoding. When the received broadcast signals are analog broadcast signals, the broadcast signals may be converted into digital signals by the A/D converter 140.

Demultiplexing may be performed by the channel browsing processor 170 or the controller 160. The demodulated signals may be input in the form of streams TS1 and TS2 to the channel browsing processor 170.

The channel browsing processor 170 may demultiplex one of the input streams TS1 and TS2 and may allow the other stream to bypass the processing of the channel browsing processor 170 so that the channel browsing processor 170 outputs the bypassed (i.e., unaltered) stream as a main stream TSb.

The controller 160 demultiplexes the main stream TSb that has bypassed the processing of the channel browsing processor 170 and controls the display 180 to display an image of a channel that the user wishes to view. The controller 160 demultiplexes the sub-stream TSa including the thumbnail images generated by the channel browsing processor 170 and controls the display 180 to display a thumbnail list when the user has input a channel list view command.

Then, the controller 160 determines whether or not the received broadcast signal is a broadcast signal of a scrambled channel, an audio channel, or a data channel (S515). When the received broadcast signal is a broadcast signal of a scrambled channel, an audio channel, or a data channel, the controller 160 generates a thumbnail image based on broadcast information included in the broadcast signal (S520). When the received broadcast signal is not a broadcast signal of a scrambled channel, an audio channel, or a data channel, i.e., when the received broadcast signal is a video channel, the controller 160 generates a thumbnail image based on the video signal included in the broadcast signal (S525).

The channel browsing processor 170 analyzes a header (for example, a PID) of the stream during demultiplexing of the stream and determines whether or not the stream is a stream of a scrambled channel, an audio channel, or a data channel. When the stream is a stream of a scrambled channel, an audio channel, or a data channel, a thumbnail image is generated using a program information such as EPG information or broadcast information since the stream has been scrambled or contains no image. The generated thumbnail image may include at least one of a program title, a program description, a start time, an end time, or channel information of the channel. The generated thumbnail image of the scrambled channel or the like may be converted back to a stream Tsa and the stream Tsa may be output or encoded.

When the demultiplexed stream is not a stream of a scrambled channel, an audio channel, or a data channel, i.e., when the demultiplexed stream is a stream of a video channel, the channel browsing processor 170 may change the format or the like of the video signal of the video channel to generate a thumbnail image. Here, the thumbnail image is extracted rather than being generated per se. The generated thumbnail image of the video channel is converted into a stream to be output to the controller 160 or to be encoded and output.

The controller 160 determines whether or not a channel list view command has been input (S530) and displays a thumbnail list including the generated thumbnail image(s) when a channel list view command has been input (S535).

First, the controller 160 determines whether or not the user has input a channel list view command. Specifically, the controller 160 determines whether or not a channel list view key on the remote controller 200 has been pressed or a channel list view item has been selected from among various menu items of the image display apparatus 100.

When the user has input a channel list view command, the controller 160 displays a thumbnail list including thumbnail images on the display 180. The thumbnail list may be displayed through compact list viewing or full list viewing.

To accomplish this, the controller 160 may demultiplex the input stream to extract the generated thumbnail images. The controller 160 then generates a thumbnail list including a thumbnail image of a scrambled channel or the like and a thumbnail image of a video channel and controls the display 180 to display the generated thumbnail list.

Figure 6:
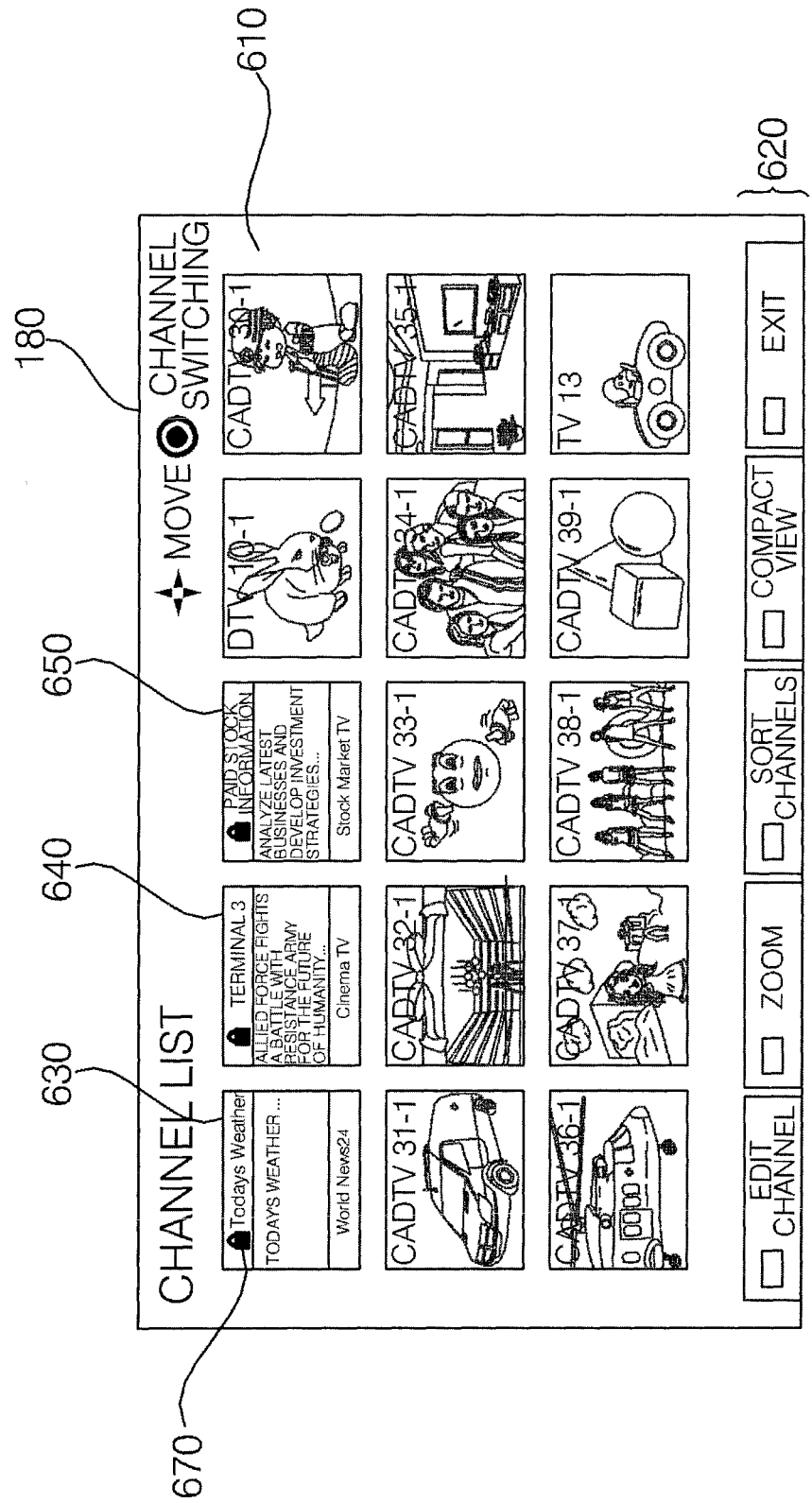

FIG. 6 illustrates exemplary full viewing of a video channel list. In this example, a thumbnail list 610 is displayed so as to cover almost the entirety of the display 180. The thumbnail list 610 includes thumbnail images 630, 640, and 650 corresponding to three scrambled channels. A menu 620 including an "edit channel" item, a "zoom" item, a "sort channels" item, a "compact view" item, and an "exit" item are also displayed at a lower portion of the display 180.

Unlike other thumbnail images, each of the thumbnail images 630, 640, and 650 may include at least one of information of the channel (World News 24, Cinema TV, or Stock Market TV), a title of the program of the channel (Today's Weather, Terminal 3, or European Stock Information), or program information (summary of the program). Each of the thumbnail images 630, 640, and 650 may also include a "locked" icon 670. Thus, the user can easily identify content of the scrambled channel. Each of the thumbnail images 630, 640, and 650 may be displayed in a banner or scroll format when the thumbnail image of the scrambled channel includes a great amount of broadcast information.

During full list viewing, the channel browsing processor 170 does not output the main stream Tsb and instead outputs the sub-stream Tsa.

Figure 7:
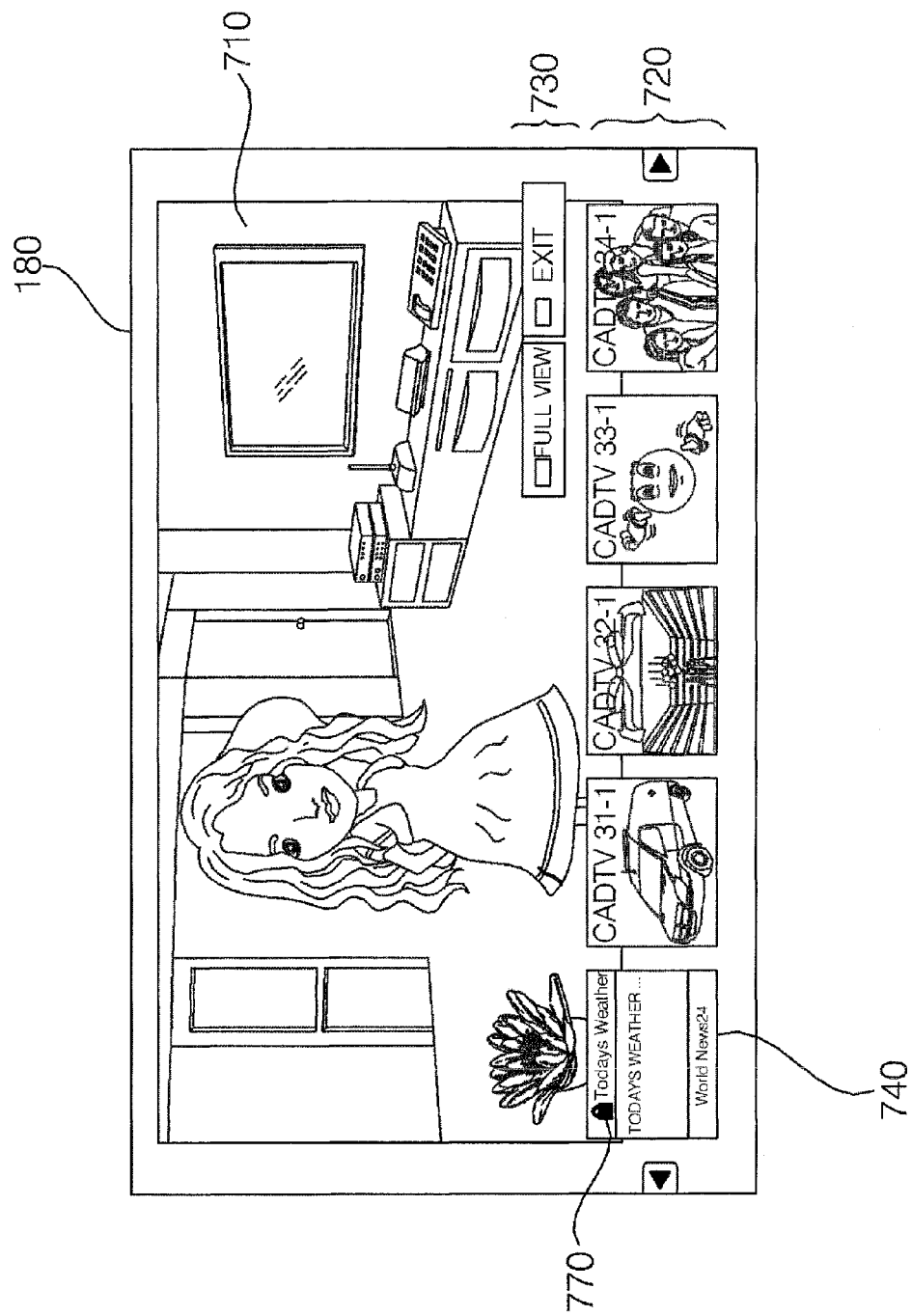

FIG. 7 illustrates exemplary compact viewing of a video channel list. In this example, a thumbnail list 720 may be displayed on a lower portion of the display 180 while a broadcast image 710, which is being viewed by the user, is being displayed on the display 180.

In this example, the thumbnail list 720 includes a thumbnail image 740 corresponding to a single scrambled channel. A menu 730 including a "full view" item and an "exit" item is displayed on a portion of the display 180. The thumbnail image 740 corresponding to the scrambled channel may include broadcast information such as channel information, similar to the thumbnail images 630, 640, and 650 described above. The thumbnail image 740 may also include a "locked" icon 770 indicating that the channel is scrambled.

Thus, the user can easily identify the content of the scrambled channel.

During compact list viewing, the channel browsing processor 170 outputs both the main stream TSb and the sub-stream TSa.

Figure 8:
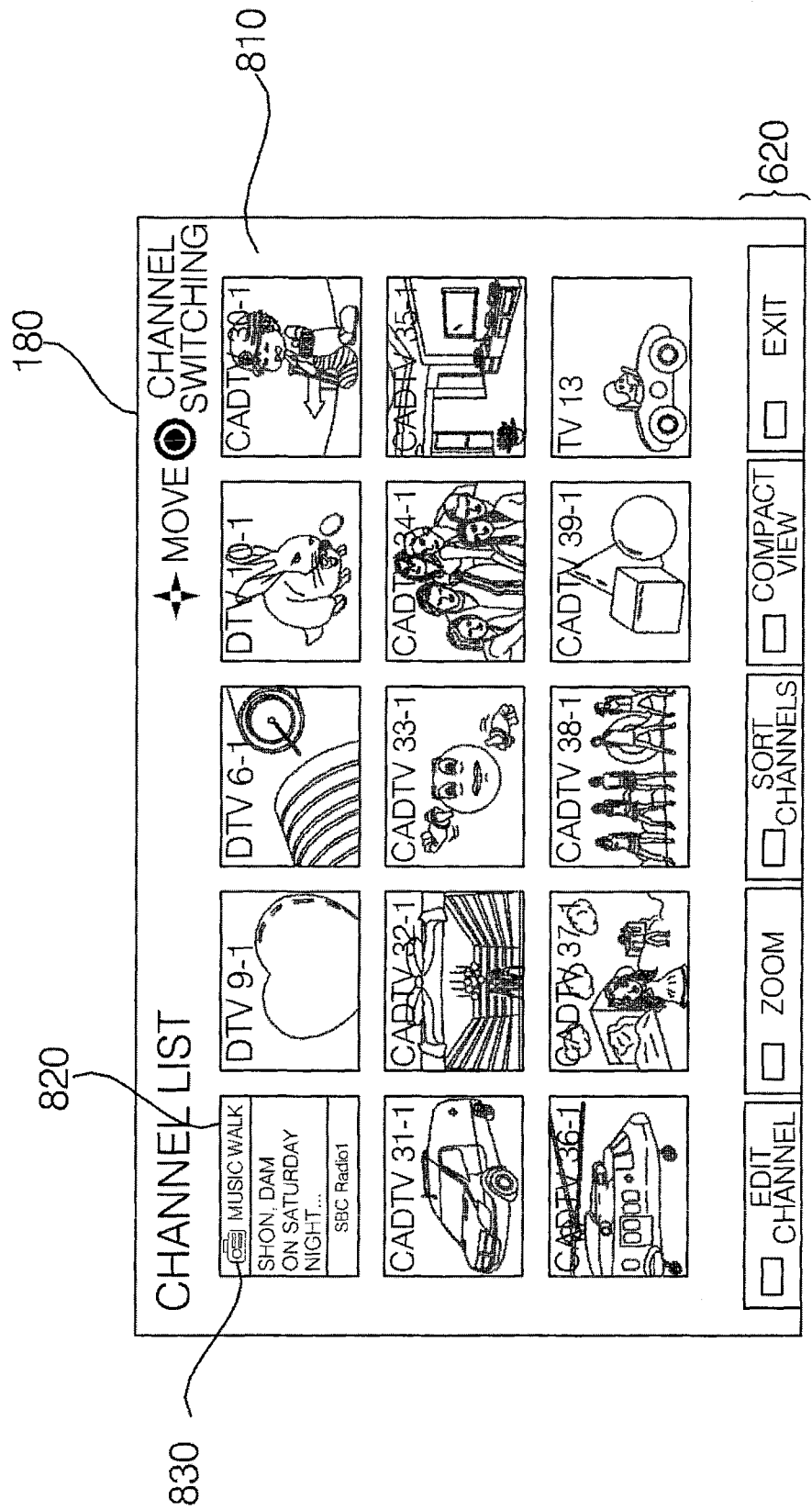

FIG. 8 illustrates a thumbnail list 810 including a thumbnail image 820 of an audio channel.

Unlike other thumbnail images, the thumbnail image 820 corresponding to an audio channel may include at least one of information of the channel (SBC radio 1), the title of a program of the channel (Music Walk), or information of the program (summary of the program). The thumbnail image 820 may also include an icon 830 indicating that the channel is an audio channel. Thus, the user can easily identify the content of the audio channel. Although full list viewing is illustrated in FIG. 8, brief list viewing is also possible.

Figure 9:
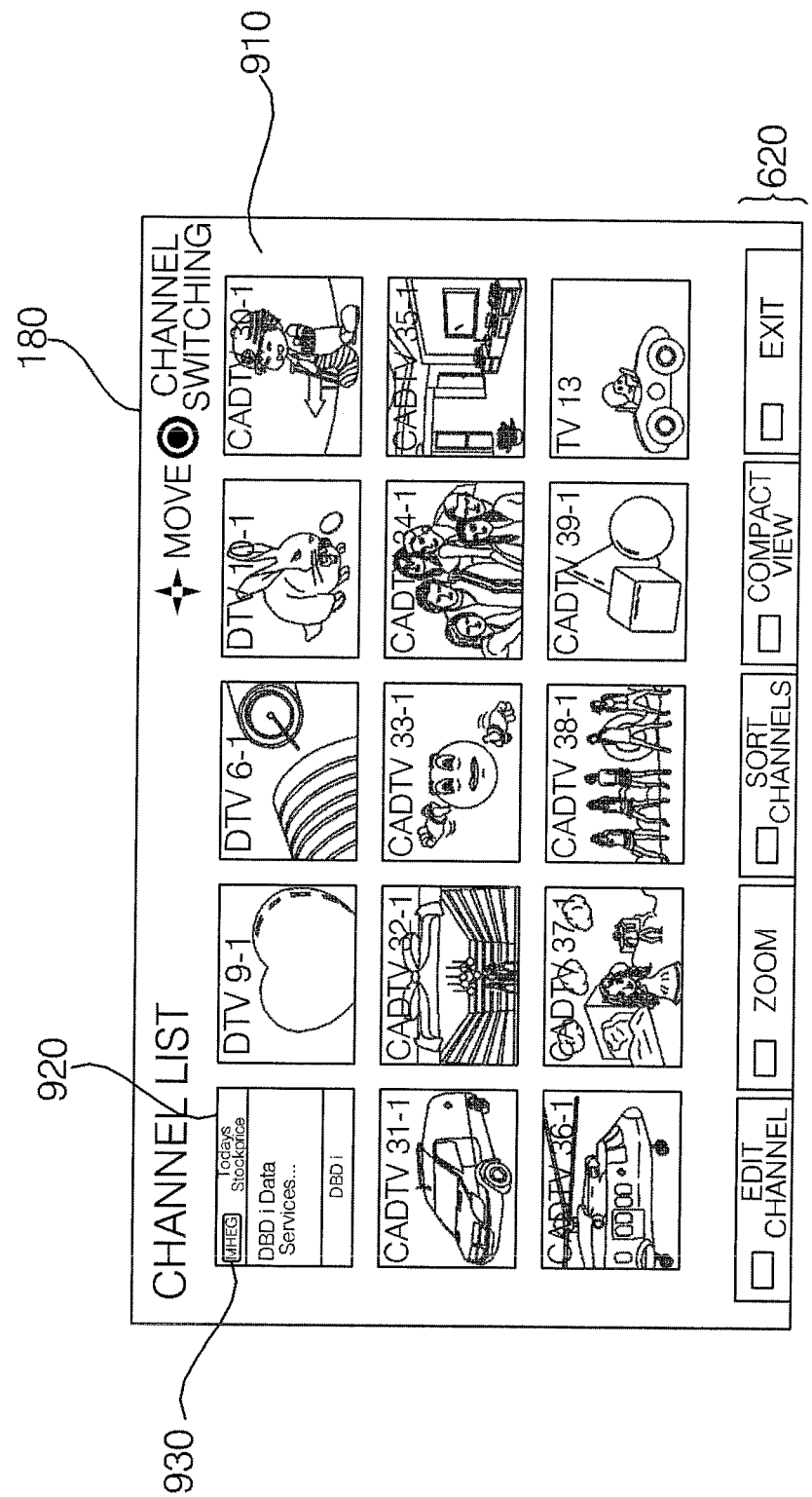

FIG. 9 illustrates a thumbnail list 910 including a thumbnail image 920 of a data channel.

Unlike other thumbnail images, the thumbnail image 920 corresponding to a data channel may include at least one of information of the channel (DBD i), the title of a program of the channel (Today's Stock Price), or information of the program (summary of the program). The thumbnail image 920 may also include an icon 930 indicating that the channel is a data channel.

The data channel may be a Multimedia and Hypermedia information coding Experts Group (MHEG), Multimedia Home Platform (MHP), Open Cable Application Platform (OCAP), Advanced Common Application Platform (ACAP), Broadcast Markup Language (BML), or Ginga-based data channel.

Thus, the user can easily identify the content of the data channel. Although full list viewing is illustrated in FIG. 9, brief list viewing is also possible.

Various operations may be performed when a thumbnail list is being displayed. The following are various exemplary operations when a thumbnail list is being displayed.

First, at least one thumbnail image in a thumbnail list is updated (S540). The updated thumbnail list is displayed (S545). The channel browsing processor 170 updates thumbnail images. Specifically, when a plurality of channels are subsequently received through the second tuner 125, a stream TS2 is received through the second demodulator 135 and a thumbnail image of the channel is newly generated, i.e., updated, sequentially or at regular intervals. Thumbnail image update may be performed on all channels displayed for the thumbnail list or for all stored channels. A thumbnail image of a channel including a new program may be updated at intervals of a period different from those of other thumbnail images.

The controller 160 receives the updated thumbnail image and controls the display 180 to display the thumbnail list including the updated thumbnail image. The thumbnail images of the thumbnail list may be sequentially updated as described above.

Figure 10:
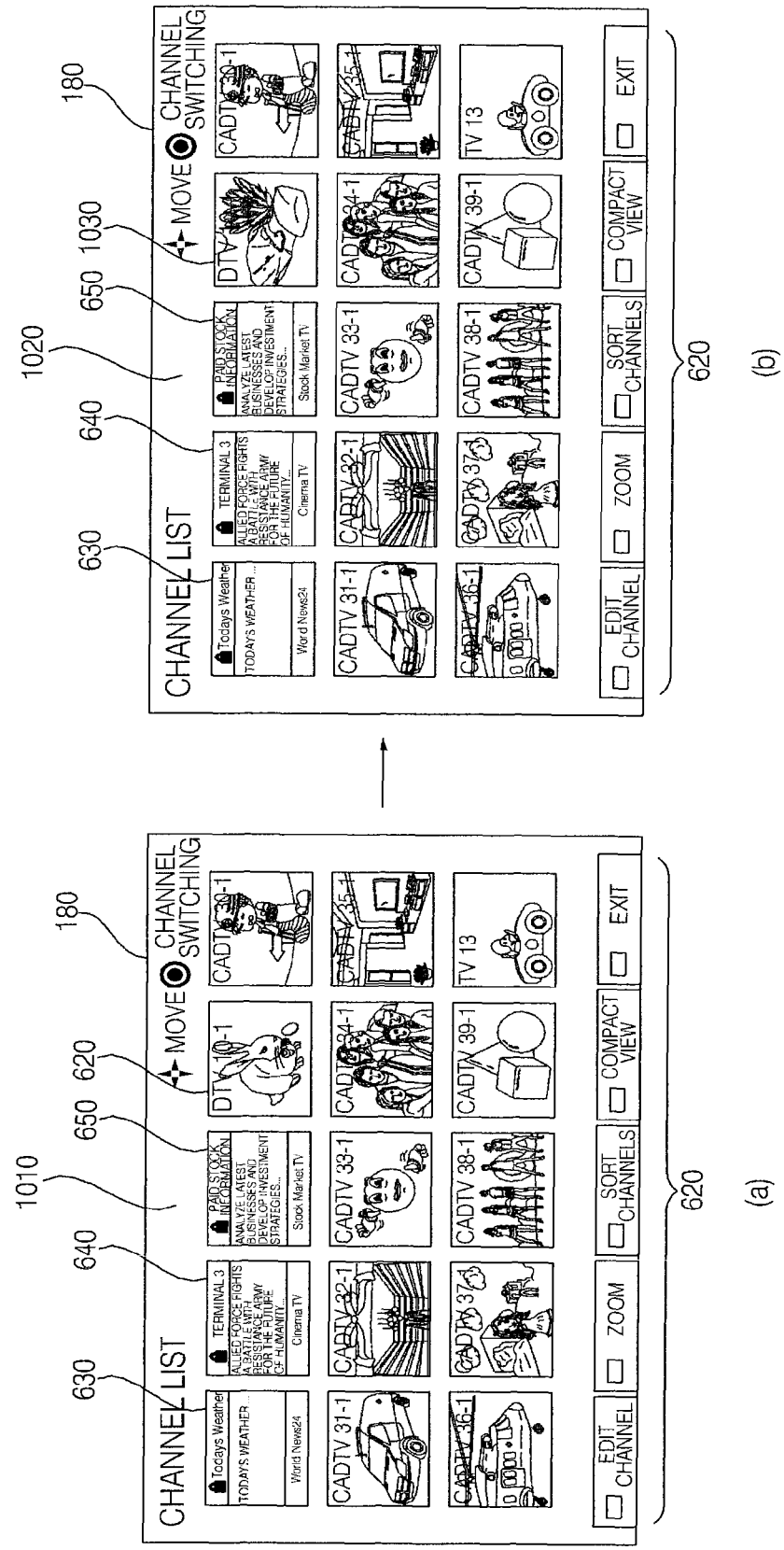

FIG. 10 illustrates exemplary update of thumbnail images.

FIG. 10(*a*) illustrates thumbnail images 630, 640, and 650 corresponding to three scrambled channels. Especially, FIG. 10(*a*) illustrates a first thumbnail image 620 among thumbnail images corresponding to video channels.

FIG. 10(*b*) illustrates that the first thumbnail image has been updated among the thumbnail images in the thumbnail list. The updated thumbnail image 1030 is displayed in the updated thumbnail list 1020. Thereafter, a thumbnail image at the right side of the first thumbnail image 1030 may be updated.

As shown in FIG. 10, from the viewpoint of user comfort, the update period of a thumbnail image corresponding to a video channel which is based on a video signal is preferably set to be shorter than the update period of a thumbnail image corresponding to a scrambled channel which is based on a broadcast signal.

Then, whether or not an instruction (or command) to focus upon a thumbnail image has been input is determined (S550). When an instruction to focus upon a thumbnail image has been input, the focused thumbnail image is reproduced (S555). One of the thumbnail images in the thumbnail list 610 may be focused upon according to user input using the remote controller 200. For example, a thumbnail image may be focused upon by pressing a navigation key on the remote controller 200 or by moving a pointer of a pointing device. The focused thumbnail image may be enlarged or highlighted unlike other thumbnail images.

The focused thumbnail image may be reproduced in the thumbnail list. Specifically, a broadcast signal of a channel corresponding to the focused thumbnail image is received through the first tuner 120 and passes through the first demodulator 130 and is then output as a main stream TSb after bypassing the channel browsing processor 170. Each broadcast signal of other thumbnail images is received by the second tuner 125 and passes through the second demodulator 135 and is then output as a sub-stream TSa through the channel browsing processor 170. The controller 160 converts a broadcast image corresponding to the main stream TSb into an image having a thumbnail image size and controls the display 180 to display the converted image.

Thus, focusing allows the user to preview of the channel, e.g., actual tuning of one of the tuners to the channel to display the information and watch the channel while the thumbnail list is displayed.

Figure 11:
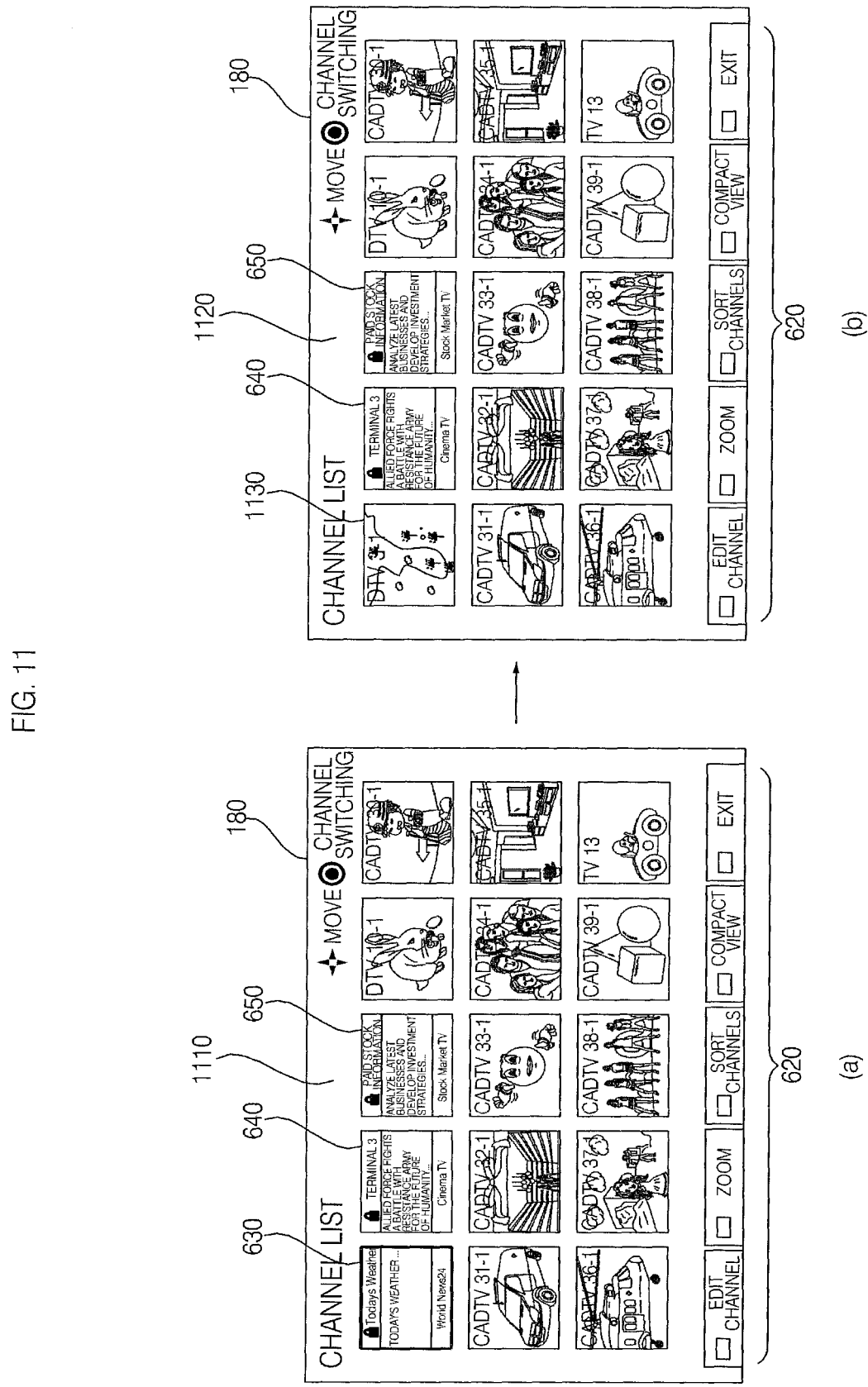

FIG. 11(*a*) illustrates that a first thumbnail image 630 is focused upon among thumbnail images 630, 640, and 650 of three scrambled channels in a thumbnail list 1110. Since the focused thumbnail image corresponds to a scrambled channel, there is a need to perform a descrambling operation in addition to the above operations. Thus, the descrambling processor 145, which has performed only a bypass operation, performs a descrambling process for descrambling a channel corresponding to the focused thumbnail image. For example, the descrambling processor 145 may decode an encrypted PID or the like in the stream. The descrambling processor 145 then outputs the decrypted stream to the channel browsing processor 170. The channel browsing processor 170 performs a bypass operation as described above to output the stream as a main stream.

FIG. 11(*b*) illustrates that a thumbnail image 1130, into which the first thumbnail image of the scrambled channel has been descrambled, rather than the thumbnail image of the broadcast information is reproduced in a thumbnail list 1120. The controller 160 receives a decrypted stream from the channel browsing processor 170, scales the received stream, and then performs a control operation to reproduce the resulting stream in the thumbnail list 1120.

Figure 12:
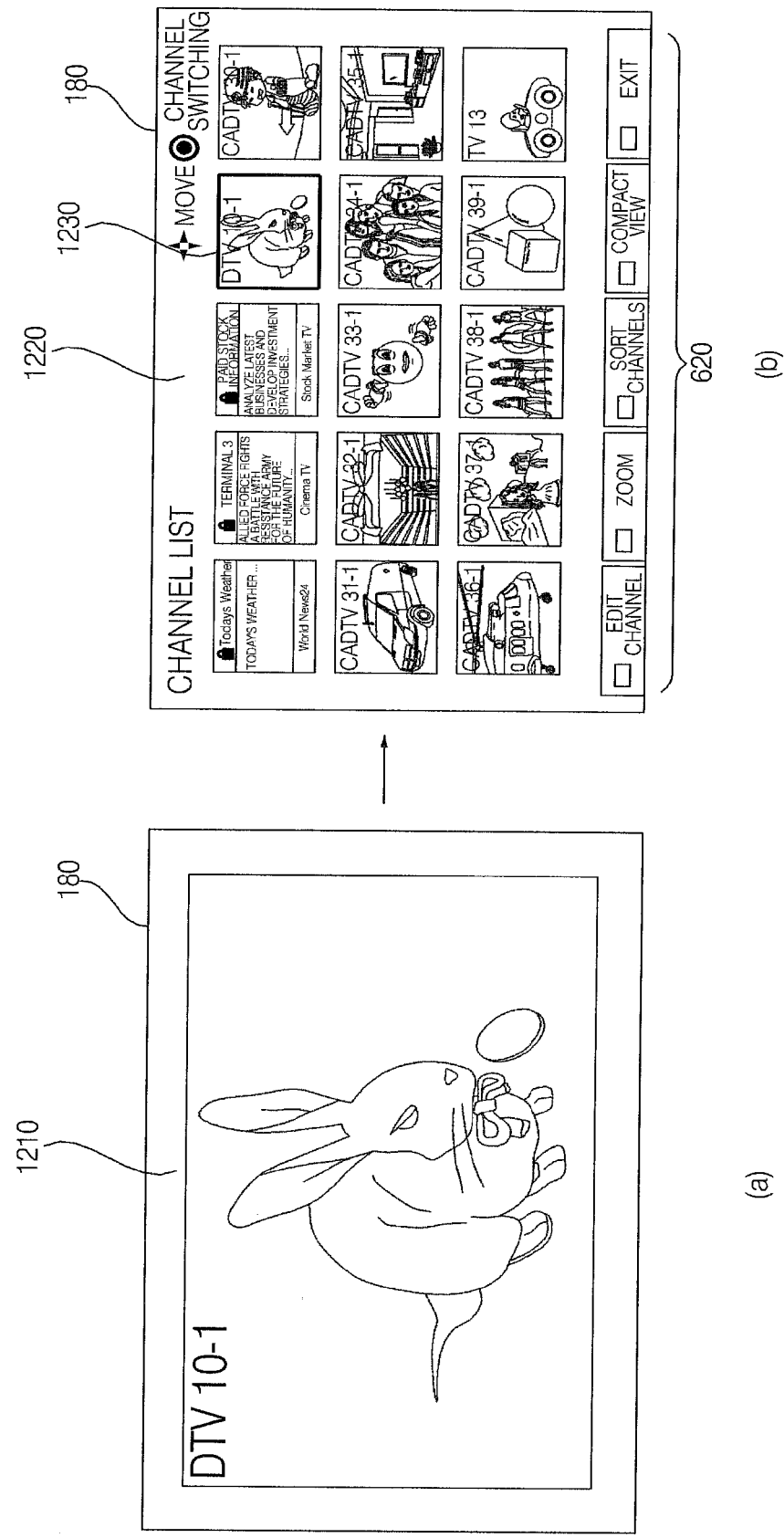

FIG. 12(*a*) illustrates that a broadcast image 1210 corresponding to a specific channel (DTV 10-1) is displayed on the display 180 and FIG. 12(*b*) illustrates that a thumbnail list 1220 is displayed according to an input of a video channel list view command. Here, a thumbnail image 1230 corresponding to the broadcast image 1210 that is being viewed is automatically focused upon. A thumbnail image 1230 may also be automatically reproduced as the thumbnail image 1230 is focused upon.

When a thumbnail image is focused upon in a displayed thumbnail list, the thumbnail image may be reproduced in the above manner to allow the user to identify details of the focused thumbnail image.

Then, the controller 160 determines whether or not an instruction to select a thumbnail image has been input (S560) and displays an image corresponding to the selected thumbnail image on the display 180 upon determining that the instruction has been input (S565).

Figure 13:
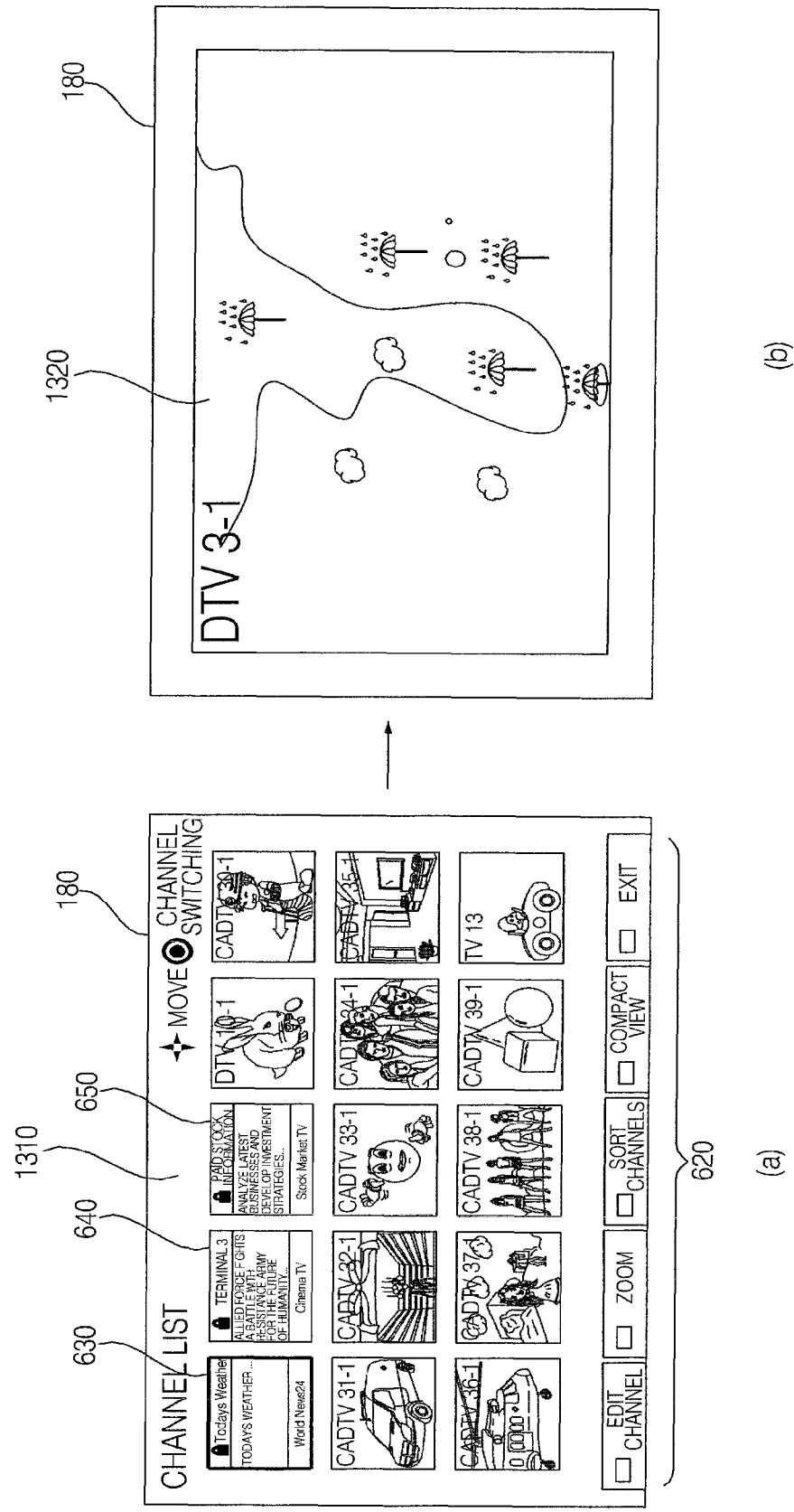
Figure 14:
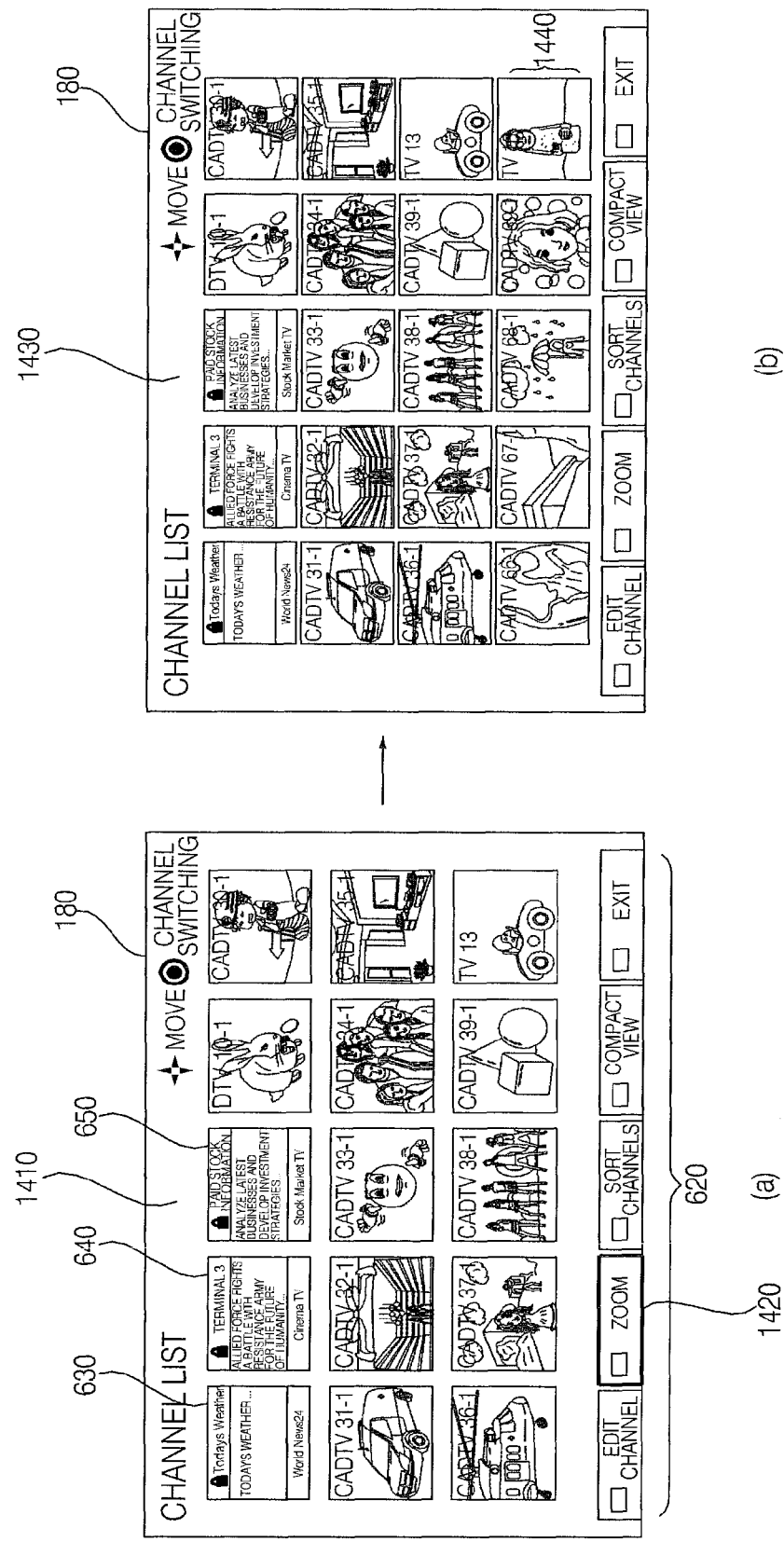

As shown in FIG. 13(*a*), the controller 160 may determine whether or not one thumbnail image has been selected through the remote controller 200 when a thumbnail list 1310 of a video channel list is being displayed. FIG. 13(*a*) illustrates that a first thumbnail image 630 has been selected.

When the first thumbnail image 630 has been selected, a broadcast image 1330 corresponding to the first thumbnail image 630 is displayed on the display 180 as shown in FIG. 13(*b*).

In the case where a thumbnail image 630 of a scrambled channel has been selected, the display 180 displays an image corresponding to the thumbnail image 630 based on a stream descrambled by the descrambling processor 145 with reference to FIG. 11. When an audio channel or a data channel has been selected, audio may be reproduced or data may be displayed on the display 180.

The user may easily perform channel selection when a thumbnail list 1510 of a video channel list is being displayed.

Then, the controller 160 determines whether or not an instruction to change the number of thumbnail images in the thumbnail list has been input (S570) and changes the number of displayed thumbnail images in the thumbnail list upon determining that the instruction has been input (S575).

The controller 160 may determine whether or not a "zoom" item 1420 in a menu 620 has been selected through the remote controller 200 when a thumbnail list 1410 of a video channel list is being displayed as shown in FIG. 14(a).

When the "zoom" item 1420 has been selected, the controller 160 may change the number of thumbnail images in the thumbnail list 1430. For example, when 15 thumbnail images are being displayed as shown in FIG. 14(a), 20 thumbnail images may be displayed through selection of the "zoom" item 1420 as shown in FIG. 14(b). That is, 5 thumbnail images 1440 may be added. The number of thumbnail images may be changed to a different number of thumbnail images than in the shown example. For example, 15 thumbnail images may be changed to 35 thumbnail images and then to 54 thumbnail images. The user can quickly and easily identify the content of a number of channels since they can display thumbnail images of a number of channels on one screen.

The controller 160 then determines whether or not an instruction to edit a thumbnail image has been input (S580) and edits a registration state of a channel corresponding to the thumbnail image into a favorite channel, a deleted channel, or a locked channel upon determining that the instruction has been input (S585).

The controller 160 may determine whether or not an edit item 1520 in a menu 620 has been selected through the remote controller 200 when a thumbnail list 1510 of a video channel list is being displayed as shown in FIG. 15(a).

When the edit item has been selected channel edit menu 1530 including a "view" item, a "favorite channel" item, a "lock" item, and a "delete" item may be displayed as shown in FIG. 15(b). An edit operation corresponding to the selected item is then performed.

Thus, the user can easily perform the edit operation while the thumbnail list 1510 of the video channel list is displayed.

Then, the controller 160 determines whether or not an instruction to sort a thumbnail list has been input (S590) and sorts and displays the thumbnail images according to channel numbers, according to whether or not the corresponding channels are favorite channels, according to whether or not the corresponding channels are recently viewed channels, or the like (S595).

The controller 160 may determine whether or not a sorting item 1620 in a menu 620 has been selected through the remote controller 200 when a thumbnail list 1610 of a video channel list is being displayed as shown in FIG. 16(a).

When the sorting item has been selected, a channel sorting menu 1630 including a "channel number" item, a "favorite channel" item, a "recently viewed channel" item, and a "deleted channel" item may be displayed as shown in FIG. 16(b). A sorting operation corresponding to the selected item is then performed.

Thus, the user can easily perform the sorting operation when the thumbnail list 1610 of the video channel list is being displayed.

As is apparent from the above description, according to the embodiments of the present disclosure, when a received broadcast signal is a broadcast signal of an audio channel, a data channel, or a scrambled channel, a thumbnail image is generated based on broadcast information included in the received broadcast signal, and the generated thumbnail image is displayed. Therefore, the user can easily identify the contents of various channels.

On the other hand, when the received broadcast signal is a broadcast signal of a video channel, a thumbnail image is generated based on a video signal included in the broadcast signal, and the generated thumbnail image is displayed. Therefore, the user can easily identify the contents of various channels.

In addition, it is possible to easily descramble a scrambled channel through a descrambling processor.

Further, when an instruction to view a video channel list has been input during viewing of a broadcast image of a specific channel, the broadcast image that is being viewed is focused upon in a thumbnail list. Therefore, the user can continuously identify the content of the specific channel. The user can also identify the contents of other channels through thumbnail images.

Moreover, since the focused thumbnail image is reproduced in the thumbnail list, the user can easily identify the content of a corresponding channel. Here, in the case where a scrambled channel is focused upon, the scrambled channel is descrambled so that the user can easily identify the contents of various channels including the scrambled channel.

In addition, since at least one thumbnail image is updated in the thumbnail list, the user can continuously obtain updated information so that they can easily identify the contents of various channels.

Further, various operations such as selection, editing, changing the number of thumbnail images, and sorting can be performed to improve user convenience in using the image display apparatus.

As described above, a method for operating an apparatus for providing an image on a display comprises: (a) receiving a signal for a corresponding channel at an input of the apparatus, the received signal including program information and one of first type of information and second type of information, the first type of information including a video information and at least one of an audio information, a data information or a scrambled information and the second type of information consisting essentially of at least one of an audio information, a data information or a scrambled information; (b) generating (i) a first thumbnail image based on the video information when the received signal includes the first type of information or (ii) a second thumbnail image based on program information included in the received signal when the received signal includes the second type of information; and (c) generating a thumbnail list having a plurality of thumbnail images for a plurality of channels based on steps (a) and (b), a thumbnail image for the thumbnail list being one of first thumbnail image and second thumbnail images.

As described above, an apparatus for displaying an image comprises at least one tuner configured to receive a signal corresponding to a channel, the received signal including program information and one of first type of information and second type of information, the first type of information including a video information and at least one of an audio information, a data information or a scrambled information and the second type of information consisting essentially of at least one of an audio information, a data information or a scrambled information; at least one demodulator to demodulate an input stream of the received signal; and a signal processor to process the demodulated bit stream from the demodulator, the signal processor generating a thumbnail list having a plurality of thumbnail images for the plurality of channels, a thumbnail image for the thumbnail list being one of first thumbnail image and second thumbnail image, the first thumbnail image being based on the video information when the received signal includes the first type of information, and the second thumbnail image is based on program information included in the received signal when the received signal includes the second type of information.

The image display device and the method for operating the same according to the present disclosure are not limited in their applications to the configurations and methods of the embodiments described above and all or some of the embodiments may be selectively combined to implement various modifications.

The method for operating the image display device according to the present disclosure can be embodied as processor readable code on a processor readable medium provided in the image display device. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

Additional details for thumbnail image and thumbnail list can be found in U.S. patent application Ser. No. 12/651,730 filed Jan. 4, 2010 (HI-0447) whose entire disclosure is incorporated herein by reference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for operating an apparatus for providing an image on a display, the method comprising:
  (a) receiving a signal for a corresponding channel at an input of the apparatus, the received signal including program information and one of first type of information and second type of information, the first type of information including a video information and the second type of information consisting essentially of at least one of an audio information, a data information or a scrambled information;
  (b) providing (i) a first thumbnail image based on the video information when the received signal includes the first type of information or (ii) a second thumbnail image based on program information included in the received signal when the received signal includes the second type of information;
  (c) providing a thumbnail list having a plurality of thumbnail images for a plurality of channels based on (a) the receiving of the signal and (b) the providing of the first thumbnail image or the second thumbnail image, a thumbnail image for the thumbnail list being one of the first thumbnail image and the second thumbnail image;
  (d) when a thumbnail image corresponding to a scrambled channel in the thumbnail list is selected, de scrambling a video signal of the scrambled channel; and
  (e) displaying the broadcast image corresponding to the descrambled video signal of the scrambled channel,
  wherein when the thumbnail image corresponding to the scrambled channel in the thumbnail list is displayed, the thumbnail image corresponding to the scrambled channel includes the scrambled information rather than the video signal of the scrambled channel,
  wherein the providing of the first thumbnail image or the second thumbnail image comprises:
  demultiplexing an input stream corresponding to a channel,
  determining whether or not a broadcast signal of the channel is scrambled,
  when the broadcast signal of the channel is determined to be scrambled, extracting the program information from the demultiplexed stream, generating the second thumbnail image based on the program information, and multiplexing the generated second thumbnail image,
  when the broadcast signal of the channel is determined to not be scrambled, extracting the video information from the demultiplexed stream, generating the first thumbnail image based on the video information, and multiplexing the generated first thumbnail image,
  demultiplexing the multiplexed stream, and
  extracting the first thumbnail image or the second thumbnail image based on the multiplexed stream,
  wherein the providing of the first thumbnail image or the second thumbnail image further comprises determining errors in the extracted first thumbnail image or the second thumbnail image,
  wherein when there is determined to be no error, the first thumbnail image or the second thumbnail image in the thumbnail list is displayed, and
  wherein when there is determined to be an error, the first thumbnail image or the second thumbnail image in the thumbnail list is removed.

2. The method according to claim 1, wherein the second thumbnail image includes at least one of a program tide, a program description, a start time, an end time, or channel information.

3. The method according to claim 1, wherein the thumbnail image corresponding to the scrambled channel further includes a locked icon to indicate a scrambled channel.

4. The method according to claim 1, further comprising focusing upon the second thumbnail image such that an image of the second thumbnail image is changed to provide information corresponding to at least one of audio information, data information and scrambled information.

5. The method according to claim 1, wherein when the second thumbnail image is focused upon, the scrambled information is descrambled to change an image of the second thumbnail image.

6. The method according to claim 1, further comprising displaying the first thumbnail image on the display, and when the first thumbnail image is selected, displaying a program on the display.

7. The method according to claim 1, further comprising editing a registration state of a channel corresponding to a selected thumbnail image in the thumbnail list into one of a favorite channel, a deleted channel, or a locked channel.

8. The method according to claim 1, further comprising sorting and displaying thumbnail images in the thumbnail list according to at least one of channel numbers, whether or not corresponding channels are preset favorite channels, whether or not corresponding channels are recently viewed channels, or whether or not corresponding channels are preset deleted channels.

9. The method according to claim 1, further comprising changing the number of thumbnail images in the thumbnail list and displaying the changed number of the thumbnail images in the thumbnail list.

10. The method according to claim 1, wherein the thumbnail list is displayed on at least a portion of the display.

11. The method according to claim 1, wherein the first thumbnail image in the thumbnail list is updated, and the thumbnail image corresponding to the scrambled channel in the thumbnail list is not updated.

12. The method according to claim 1, wherein the thumbnail image is a still image or a moving image.

13. The method according to claim 1, wherein displaying the thumbnail list includes:
    demultiplexing a stream including the generated thumbnail image;
    decoding an encoded thumbnail image included in the demultiplexed stream; and
    displaying a thumbnail list including the decoded thumbnail image.

14. The method according to claim 4, wherein the focused thumbnail image is provided for display on the display.

15. An apparatus for displaying an image comprising:
    at least one tuner configured to receive a signal corresponding to a channel, the received signal including program information and one of first type of information and second type of information, the first type of information including a video information and the second type of information consisting essentially of at least one of an audio information, a data information or a scrambled information;
    at least one demodulator to demodulate an input stream of the received signal;
    a descrambling processor configured to de scramble the scrambled information when a scrambled channel is selected; and
    a signal processor:
    to demultiplex an input stream corresponding to a channel,
    to determine whether or not a broadcast signal of the channel is scrambled,
    when the broadcast signal of the channel is determined to be scrambled, to extract the program information from the demultiplexed stream, to generate the second thumbnail image based on the program information, and to multiplex the generated second thumbnail image,
    when the broadcast signal of the channel is determined to not be scrambled, to extract the video information from the demultiplexed stream, to generate the first thumbnail image based on the video information, and to multiplex the generated first thumbnail image;
    a controller coupled to the signal processor and the display, the controller configured to demultiplex the multiplexed stream, to extract the first thumbnail image or the second thumbnail image based on the multiplexed stream, and to provide a thumbnail list having a plurality of thumbnail images for a plurality of channels, to control the display to display the thumbnail list, the plurality of thumbnail images including at least one of the first thumbnail image and the second thumbnail image; and
    a display configured to display the thumbnail list,
    wherein when the thumbnail image corresponding to the scrambled channel in the thumbnail list is displayed, the thumbnail image of the scrambled channel includes not the video signal of the scrambled channel but rather the thumbnail image of the scrambled channel includes the scrambled information,
    wherein when a thumbnail image corresponding to a scrambled channel in the thumbnail list is selected, the display displays broadcast image corresponding to the scrambled channel.
    wherein the controller comprising:
    a demultiplexer configured to demultiplex stream from the signal processor;
    a thumbnail image extractor configured to extract a thumbnail image based on the demultiplexed stream; and
    an error detector configured to determine errors in the extracted thumbnail image,
    wherein when there is determined to be no error, the first thumbnail image or the second thumbnail image in the thumbnail list is displayed, and
    wherein when there is determined to be an error, the first thumbnail image or the second thumbnail in the thumbnail list is removed.

16. The apparatus according to claim 15, wherein a first tuner of the at least one tuner to receive a broadcast signal for displaying a broadcast image on the display, and a second tuner of the at least one tuner to sequentially receive broadcast signals corresponding to a plurality of broadcast channels, the received broadcast signals used for generating a plurality of the thumbnail images for the thumbnail list.

17. The apparatus according to claim 15, wherein the thumbnail image corresponding to the scrambled channel further includes a locked icon to indicate a scrambled channel.

18. The apparatus according to claim 15, wherein the controller includes a single stream input port, wherein a stream of the thumbnail image generated by the signal processor and a stream that has bypassed the signal processor are transmitted through the single stream input port.

* * * * *